(12) United States Patent
Vdovin et al.

(10) Patent No.: US 10,459,238 B2
(45) Date of Patent: Oct. 29, 2019

(54) AUTOSTEREOSCOPIC DISPLAY DEVICE

(71) Applicant: KONINKLIJKE PHILIPS N.V., Eindhoven (NL)

(72) Inventors: Olexandr Valentynovych Vdovin, Maarheeze (NL); Bart Kroon, Eindhoven (NL); Mark Thomas Johnson, Arendonk (BE); Eibert Gerjan Van Putten, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 291 days.

(21) Appl. No.: 15/532,131

(22) PCT Filed: Dec. 21, 2015

(86) PCT No.: PCT/EP2015/080839
§ 371 (c)(1),
(2) Date: Jun. 1, 2017

(87) PCT Pub. No.: WO2016/102495
PCT Pub. Date: Jun. 30, 2016

(65) Prior Publication Data
US 2017/0307898 A1      Oct. 26, 2017

(30) Foreign Application Priority Data

Dec. 24, 2014 (EP) .................................... 14200331

(51) Int. Cl.
*G02B 27/22* (2018.01)
*H04N 13/305* (2018.01)
(Continued)

(52) U.S. Cl.
CPC ....... *G02B 27/2214* (2013.01); *H04N 13/305* (2018.05); *H04N 13/307* (2018.05); *H04N 13/317* (2018.05); *H04N 13/324* (2018.05)

(58) Field of Classification Search
CPC ............. G02B 27/2214; H04N 13/305; H04N 13/324; H04N 13/317; H04N 13/307
See application file for complete search history.

(56) References Cited

U.S. PATENT DOCUMENTS

| 8,416,289 B2 | 4/2013 | Akeley |
| 2006/0195293 A1 | 8/2006 | Koike et al. |

(Continued)

FOREIGN PATENT DOCUMENTS

| WO | 2010070564 A2 | 6/2010 |
| WO | 2014173853 A1 | 10/2014 |

OTHER PUBLICATIONS

Vladimir Saveljev Et Al "Reference Functions for Synthesis and Analysis of Multiview and Integral Images" Journal of the Optical Society of Korea, vol. 17, No. 2, Apr. 2013, pp. 148-161.

(Continued)

*Primary Examiner* — Wen Huang

(57) ABSTRACT

An autostereoscopic display comprises a pixelated display panel comprising an array of single color pixels or an array of sub-pixels of different colors and a view forming arrangement comprising an array of lens elements. The pixels form a hexagonal grid, and the lenses also repeat in a hexagonal grid. A vector p is defined which relates to a mapping between the pixel grid and the lens grid. Regions in the two dimensional space for this vector p are identified which give good or poor banding performance, and the better banding performance regions are selected.

12 Claims, 19 Drawing Sheets

(51) Int. Cl.
*H04N 13/324* (2018.01)
*H04N 13/317* (2018.01)
*H04N 13/307* (2018.01)

(56) References Cited

U.S. PATENT DOCUMENTS

2008/0291267 A1  11/2008  Leveco et al.
2009/0244084 A1  10/2009  Dammertz
2011/0075256 A1   3/2011  De Zwart
2013/0182319 A1   7/2013  Chung
2013/0286053 A1  10/2013  Fleck et al.

OTHER PUBLICATIONS

Liao Et Al "High-quality integral videography using a Multiprojector", Optics Express, vol. 12, No. 6, Mar. 22, 2004.

AUTOSTEREOSCOPIC DISPLAY DEVICE

CROSS-REFERENCE TO PRIOR APPLICATIONS

This application is the U.S. National Phase application under 35 U.S.C. § 371 of International Application No. PCT/EP2015/080839, filed on Dec. 21, 2015, which claims the benefit of EP Patent Application No. EP 14200331.8, filed on Dec. 24, 2014. These applications are hereby incorporated by reference herein.

FIELD OF THE INVENTION

This invention relates to an autostereoscopic display device and a driving method for such a display device.

BACKGROUND OF THE INVENTION

A known autostereoscopic display device comprises a two-dimensional liquid crystal display panel having a row and column array of display pixels (wherein a "pixel" typically comprises a set of "sub-pixels", and a "sub-pixel" is the smallest individually addressable, single-color, picture element) acting as an image forming means to produce a display. An array of elongated lenses extending parallel to one another overlies the display pixel array and acts as a view forming means. These are known as "lenticular lenses". Outputs from the display pixels are projected through these lenticular lenses, whose function is to modify the directions of the outputs.

The pixel comprises the smallest set of sub-pixels which can be addressed to produce all possible colors. For the purposes of this description, a "unit cell" is also defined. The unit cell is defined as the smallest set of sub-pixels which repeat to form the full sub-pixel pattern. The unit cell may be the same arrangement of sub-pixels as a pixel. However, the unit cell may include more sub-pixels than a pixel. This is the case if there are pixels with different orientations of sub-pixels, for example. The overall sub-pixel pattern then repeats with a larger basic unit (the unit cell) than a pixel.

The lenticular lenses are provided as a sheet of lens elements, each of which comprises an elongate partially-cylindrical (e.g. semi-cylindrical) lens element. The lenticular lenses extend in the column direction of the display panel, with each lenticular lens overlying a respective group of two or more adjacent columns of display sub-pixels.

Each lenticular lens can be associated with two columns of display sub-pixels to enable a user to observe a single stereoscopic image. Instead, each lenticular lens can be associated with a group of three or more adjacent display sub-pixels in the row direction. Corresponding columns of display sub-pixels in each group are arranged appropriately to provide a vertical slice from a respective two dimensional sub-image. As a user's head is moved from left to right a series of successive, different, stereoscopic views are observed creating, for example, a look-around impression.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of rows and columns of display sub-pixels 5. For the sake of clarity, only a small number of display sub-pixels 5 are shown in the Figure. In practice, the display panel 3 might comprise about one thousand rows and several thousand columns of display sub-pixels 5. In a black and white display panel a sub-pixel in fact constitutes a full pixel. In a color display a sub-pixel is one color component of a full color pixel. The full color pixel, according to general terminology comprises all sub-pixels necessary for creating all colors of a smallest image part displayed. Thus, e.g. a full color pixel may have red (R) green (G) and blue (B) sub-pixels possibly augmented with a white sub-pixel or with one or more other elementary colored sub-pixels. The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display sub-pixel 5 comprises opposing electrodes on the substrates, with the intervening liquid crystal material there between. The shape and layout of the display sub-pixels 5 are determined by the shape and layout of the electrodes. The display sub-pixels 5 are regularly spaced from one another by gaps.

Each display sub-pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display sub-pixels 5 being driven to modulate the light and produce the display.

The display device 1 also comprises a lenticular sheet 9, arranged over the display side of the display panel 3, which performs a light directing function and thus a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses each having an elongate axis 12 extending perpendicular to the cylindrical curvature of the element, and each element acts as a light output directing means to provide different images, or views, from the display panel 3 to the eyes of a user positioned in front of the display device 1.

The display device has a controller 13 which controls the backlight and the display panel.

The autostereoscopic display device 1 shown in FIG. 1 is capable of providing several different perspective views in different directions, i.e. it is able to direct the pixel output to different spatial positions within the field of view of the display device. In particular, each lenticular element 11 overlies a small group of display sub-pixels 5 in each row, where, in the current example, a row extends perpendicular to the elongate axis of the lenticular element 11. The lenticular element 11 projects the output of each display sub-pixel 5 of a group in a different direction, so as to form the several different views. As the user's head moves from left to right, his/her eyes will receive different ones of the several views, in turn.

The skilled person will appreciate that a light polarizing means must be used in conjunction with the above described array, since the liquid crystal material is birefringent, with the refractive index switching only applying to light of a particular polarization. The light polarizing means may be provided as part of the display panel or the view forming arrangement of the device.

FIG. 2 shows the principle of operation of a lenticular type view forming arrangement as described above and shows the light source 7, display panel 3 and the lenticular sheet 9. The arrangement provides three views each projected in different directions. Each sub-pixel of the display panel 3 is driven with information for one specific view.

In the designs above, the backlight generates a static output, and all view direction is carried out by the lenticular arrangement, which provides a spatial multiplexing approach. A similar approach is achieved using a parallax barrier.

The lenticular arrangement only provides an autostereoscopic effect with one particular orientation of the display. However, many hand held devices are rotatable between portrait and landscape viewing modes. Thus, a fixed lenticular arrangement does not allow an autostereoscopic viewing effect in different viewing modes. Future 3D displays, especially for tablets, mobile phones and other portable devices will thus have a possibility to observe 3D images from many directions and for different screen orientations. Modern LCD and OLED display panels with existing pixel designs are not suited for this application. This issue has been recognized, and there are various solutions.

A dynamic solution involves providing a switchable lens arrangement, which can be switched between different modes to activate the view forming effect in different orientations. There may essentially be two lenticular arrangements, with one acting in pass through mode and the other acting in lensing mode. The mode for each lenticular arrangement may be controlled by switching the lenticular arrangement itself (for example using an LC switchable lens array) or by controlling a polarization of the light incident on the lenticular arrangement.

A static solution involves designing a lens arrangement which functions in the different orientations. A simple example can combine a rectangular grid of square sub-pixels in the display with a rectangular grid of microlenses (where the lens grid directions are either slanted or non-slanted with respect to the pixel grid directions) to create multiple views in both display orientations. The sub-pixel shapes should be preferably close to a 1:1 aspect ratio, as this will allow avoiding a problem of different angular width for individual views in portrait/landscape orientations.

An alternative grid design can be based on tessellated hexagons, and this invention relates specifically to such designs. A hexagonal grid for the display panel pixels and for the view forming arrangement (lenses) can give additional symmetry and compact packing.

One possible disadvantage of this approach is a banding effect, in which the black matrix areas between the sub-pixels are projected to the viewer as a regular pattern. Partially it can be solved by slanting the lens array. Specifically, in order to reduce banding effect due to projection of periodic black pixel matrix a view forming arrangement need to be chosen with respect to the pixel addressing direction (rows/columns).

SUMMARY OF THE INVENTION

The invention is defined by the claims.

According to the invention, there is provided an autostereoscopic display, comprising:

a pixelated display panel comprising an array of single color pixels or an array of sub-pixels of different colors with respective groups of sub-pixels together defining full color pixels; and a view forming arrangement comprising an array of lens elements, positioned over the display panel, for directing the light from different pixels or sub-pixels to different spatial locations, thereby to enable different views of a three dimensional scene to be displayed in different spatial locations, wherein the pixels of the display panel form a hexagonal grid, with a maximum internal angle deviation from 120 degrees of 20 degrees or less, and wherein the hexagonal grid repeats with basic translation vectors a and b, and the lengths of the basic translation vectors a and b have an aspect ratio of the shorter to the longer between 0.66 and 1, wherein the view forming arrangement comprises a two dimensional array of lenses which repeat in a hexagonal grid with basic translation vectors p' and q';

wherein defining a dimensionless vector p as $(p_a, p_b)$, which satisfies:

$$p' = p_a a + p_b b,$$

and defining circular regions in the space of components $p_b$ and $p_a$ for integer n as:

$$E_n = \{p \mid N(p - v) < r_n^2 \forall v \in \Gamma_n\} \text{ where}$$

$$\Gamma_n = \left\{ i + \frac{j}{n} \mid i, j \in Z^2 \wedge N(j) = n \right\}$$

with $r_n = r_0 n^{-\gamma}$ defining the radius of each circle, $\Gamma_n$ defining the circle centers, and with N comprising a vector function for two coordinate vectors defined as:

$$N\left(\begin{bmatrix} a \\ b \end{bmatrix}\right) = a^2 - ab + b^2,$$

the basic translation vectors a, b, p' and q' are selected such that with values such that p falls in the vector space which excludes the sets $E_1$, $E_3$ or $E_4$ with $r_0 = 0.1$ and $\gamma = 0.75$.

In words, the main equation above reads as follows:

(Line 1) $E_n$ is equal to the set of values of p such that the function N applied to the difference vector from a vector v to the vector p is less than $r_n^2$ for all values of vector v in the set $\Gamma_n$. The function N is subsequently defined. This defines the circles centered on the set of values $\Gamma_n$.

(Line 2) $\Gamma_n$ is the set of vector values i+j/n with i and j as vectors in the two dimensional vector space of integer values (i.e. positive and negative integers and zero) and for which function N applied to the j vector gives the answer n.

The vector p defines the spatial relationship between the pixel (or sub-pixel) grid and the grid of lenses. Thus, it defines a mapping between the pixels (or sub-pixels) and the lenses. In particular, the components of the vector p are the terms of the matrix transformation from the pixel grid vector space (defined by a and b) and the lens grid vector space (defined at least by p'). The components of the vector p in turn define how different pixels (or sub-pixels) contribute to different lens phases and how the black mask area is imaged by the grid of lenses. Thus, the vector p can be considered to be a most fundamental way to define the relationship between the lenses and the pixels.

By "basic translation vector" is meant a vector translation from one point within a pixel or lens area to a corresponding point in an adjacent pixel or lens area. The lens and pixel areas are two dimensional, so there are two translation vectors—one for each grid direction. For a regular hexagonal grid, the basic translation vectors are in row and column directions at 120 degrees to each other. For a skewed grid, the basic translation vectors may deviate from this 120 degree angle, but follow the row and column directions of the grid. Thus, the hexagonal grid of the lenses and/or of the pixels may be regular hexagonal or they may be of a non-regular hexagonal form, for example a skewed version of a regular hexagonal grid.

The circular regions define sets of possible values for the components of the vector p and thus define regions of related characteristics.

By excluding the regions near the centers of $E_1$, $E_3$ and $E_4$, banding problems are prevented. In particular, routine panel designs, for example with an integer array of sub-pixels under each lens, as well as fractional designs, correspond to values of p which fall in the center of the $E_1$, $E_3$ or $E_4$ regions.

In this way, the invention provides design parameters for display panel layouts that solve the banding problems mentioned above and enable rotatable multi-view autostereoscopic 3D displays with good performance.

The basic translation vectors a, b, p' and q' may have values such that p is not in the set $E_1$ with $r_0=0.25$ and $\gamma=0.75$.

The basic translation vectors a, b, p' and q' may have values such that p is not in the set $E_3$ with $r_0=0.25$ and $\gamma=0.75$.

The basic translation vectors a, b, p' and q' may have values such that p is not in the set $E_4$ with $r_0=0.25$ and $\gamma=0.75$.

These different regions represent progressively better banding performance, such that by excluding progressively more areas in the design space for the vector p, the remaining design options give progressively better banding performance.

The basic translation vectors a, b, p' and q' may have values such that p is not in the set or sets as defined above with $r_0=0.35$.

There are also preferred regions in the vector space for the vector p. In one example, the basic translation vectors a, b, p' and q' have values such that p is in the set $E_7$ with $r_0=0.35$ and $\gamma=0.75$.

In another example, the basic translation vectors a, b, p' and q' have values such that p is in the set $E_9$ with $r_0=0.35$ and $\gamma=0.75$.

The display device may be used in a portable device, wherein the portable device is configurable to operate in a portrait display mode and a landscape display mode. It may be a mobile telephone or tablet.

BRIEF DESCRIPTION OF THE FIGURES

Embodiments of the invention will now be described, purely by way of example, with reference to the accompanying drawings, in which:

Note that FIGS. 3a-e and 4 are intended to show square pixel and lens grids, FIGS. 12a-d to 14 are intended to show regular hexagonal pixel and lens grids, and FIGS. 5 to 8 and 15 to 19 are intended to show circular regions. Any distortions from square, regular hexagonal and circular representations are the result of inaccurate image reproduction.

DETAILED DESCRIPTION OF THE EMBODIMENTS

The invention provides an autostereoscopic display, comprising a pixelated display panel comprising an array of single color pixels or an array of sub-pixels of different colors and a view forming arrangement comprising an array of lens elements. The pixels form a hexagonal grid, and the lenses also repeat in a hexagonal grid. A vector p is defined which relates to a mapping between the pixel grid and the lens grid. Regions in the two dimensional space for this vector p are identified which give good or poor banding performance, and the better banding performance regions are selected.

The invention is based on an analysis of the effect of the relationship between the pixel grid and the lens grid on the banding performance. The banding analysis can be applied to different pixel and lens designs. Note that the term "pixel grid" is used to indicate the grid of pixels (if each pixel has only one addressable element), or the grid of sub-pixels (if each pixel has multiple independently addressable sub-pixels).

To illustrate the analytical approach, a first example will be presented based on square (or near square) pixel grids and lens grids. This invention relates specifically to hexagonal pixel and lens grids, for which an analysis is provided as a second example.

For the first example of a square pixel grid and lens grid, display panel designs are discussed with pixels on a regular 4-fold symmetric essentially square grid, on top of which there is a light modulator that also has elements in a regular 4-fold symmetric grid. For the purposes of explanation, some definitions are needed. In particular, a coordinate system of the panel (i.e. the pixel grid) needs to be defined, and a coordinate system of the view forming arrangement needs to be defined in terms of geometric (physical) coordinates and logical coordinates that are relative to the coordinate system of the panel.

Figure 1:
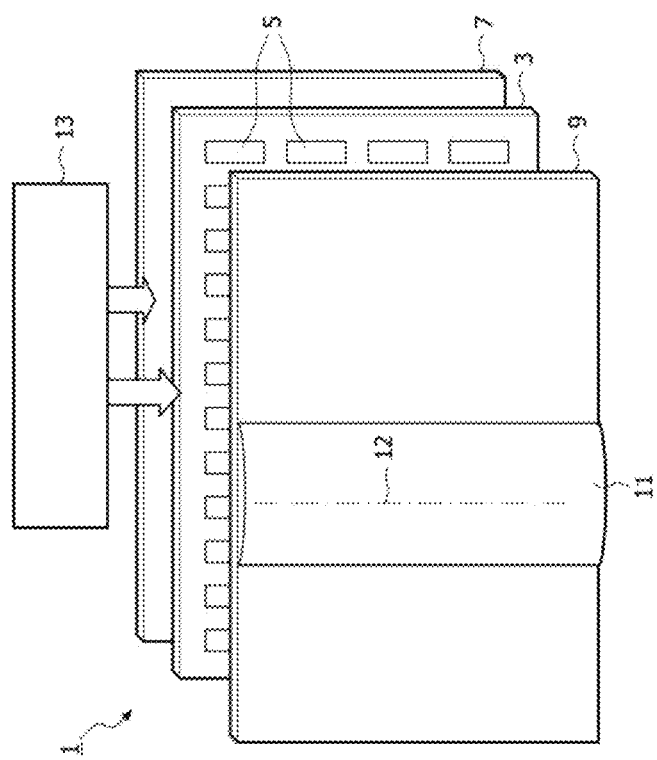
FIG. 1 is a schematic perspective view of a known autostereoscopic display device.
Figure 2:
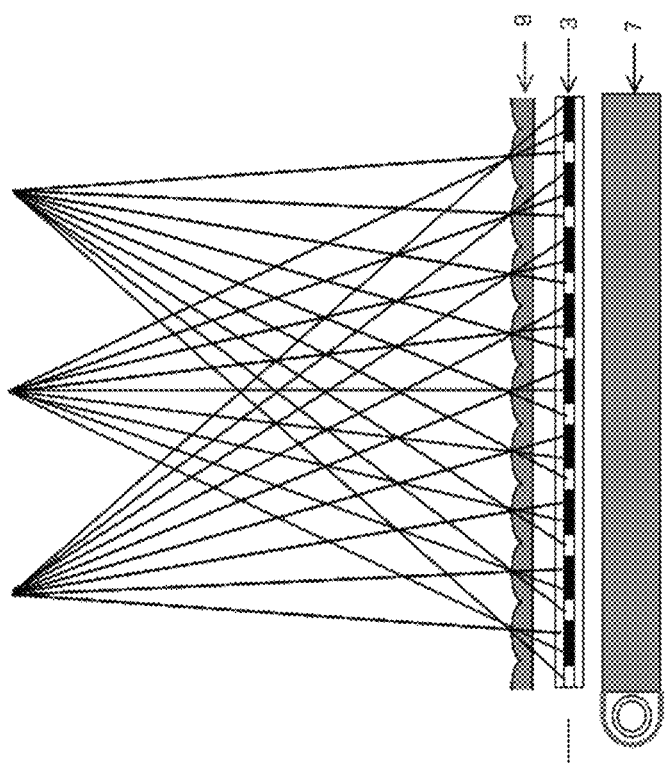
FIG. 2 is a schematic cross sectional view of the display device shown in FIG. 1.
Figure 3:
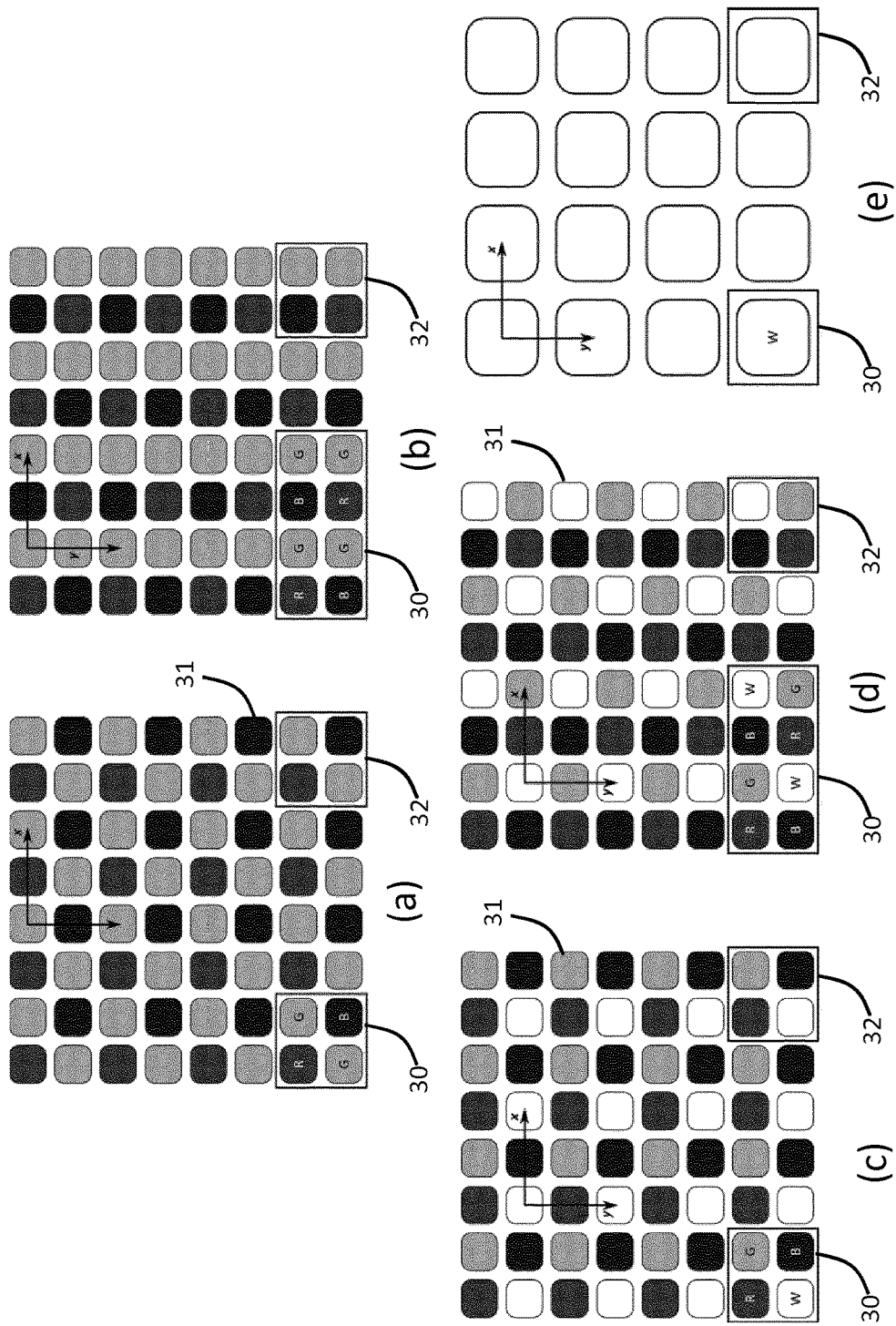
FIGS. 3a-e shows various possible pixel grids based on square or near square pixel and lens grids.

FIG. 3 shows various possible pixel grids. Each example shows the smallest unit cell 30 (i.e. the smallest set of sub-pixels 31 which repeat to form the sub-pixel pattern, as defined above) and a pixel 32 using the definition employed in this description. A pixel 32 is the smallest square arrangement of all of the primary colors so that the pixel size and shape is the same in the two orthogonal orientations.

The sub-pixels are shown as squares. However, the actual sub-pixel shape may be different. For example the actual pixel aperture will typically be an irregular shape as it may for example depend on the size and position of pixel circuit elements, such as the switching transistor in the case of an active matrix display panel. It is the pixel grid shape that is important rather than the precise shape of individual pixels or sub-pixels. The same reasoning applies to the hexagonal pixel grid discussed further below.

Pixel pitch vectors x and y are also shown. These are translation vectors between adjacent pixel centers in the row direction and the column direction, respectively. The letters in the smallest unit cell 30 indicate the primary colors: R=red, G=green, B=blue, W=white.

FIG. 3(a) shows an RGGB unit cell and an RGGB pixel, FIG. 3(b) shows an RGBGBGRG unit cell and an RGBG pixel, FIG. 3(c) shows an RGBW unit cell and an RGBW pixel, FIG. 3(d) shows an RGBWBWRG unit cell and an RGBW pixel, and FIG. 3(d) shows a W unit cell and a W pixel.

A pixel grid is defined based on the two vectors x and y, hereafter referred to as pixel pitch vectors. The vectors form a lattice matrix X=[x y] with length units (e.g. meters). There are multiple possible definitions of a pixel including the smallest unit cell, however for this description, the pixel is approximately square. Therefore X should be chosen to form an approximately square region of sub-pixels. As shown in FIGS. 3(a) to (d), for color displays, the pixel definition most simply results in a region with 2×2 sub-pixels. When the unit cell is larger, as in FIGS. 3(b) and (d), the pixel group appears rotated or mirrored to form the larger unit cell, but also in these cases X remains a 2×2 region. For monochrome displays the pixel is the region of a single sub-pixel.

The pixels do not need to be perfectly square. They may be approximately square, which is taken to mean that a rotation over any angle, a limited sheer or limited elongation is within scope. The aspect ratio is defined as:

$$a = \frac{|x|}{|y|}$$

and the angle of the grid is:

$$\theta = \cos^{-1} \frac{\langle x, y \rangle}{\sqrt{\langle x, x \rangle \langle y, y \rangle}}.$$

The sheer is then expressed as $|\theta - 90°|$. Hence for an approximately square grid it holds that $a \approx 1$ and $|\theta - 90°| \approx 0°$.

For example, a is preferably between 0.9 and 1.1 and θ is between 80 and 100 degrees (of course, if one pair of corner angles is at 80 degrees, then the other pair will be at 100 degrees).

To define the lens grid, lens pitch vectors can be defined.

Figure 4:
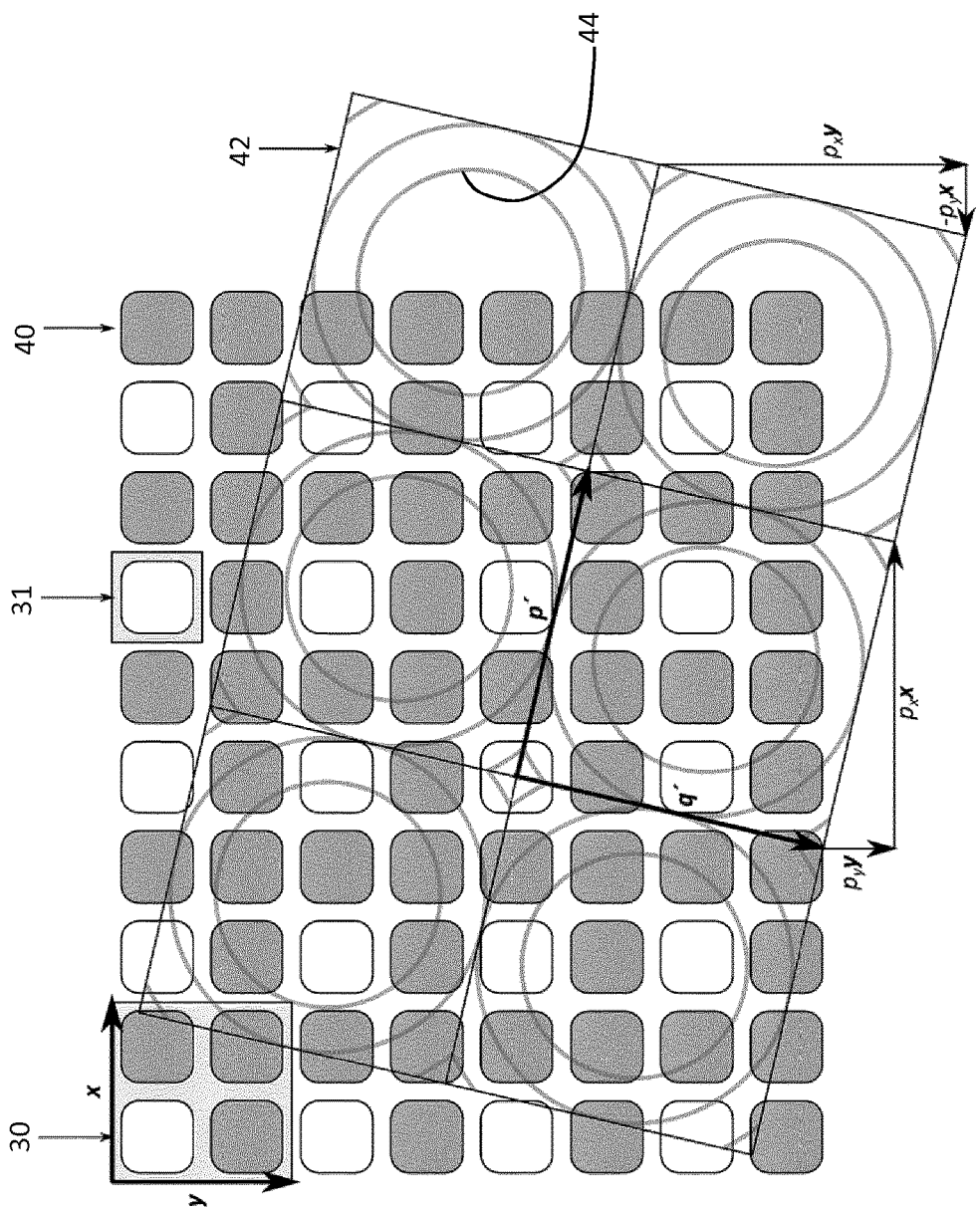
FIG. 4 shows a lens grid overlaid over a square pixel array, with a pitch vector p defining the relationship between them, for the purposes of explaining the analysis used.

FIG. 4 shows a lens grid 42 overlaid over a square pixel array 40 with 2×2 sub-pixels 31 per pixel 32 (such as in FIGS. 3(a) and (c). One out of each pixel group of four sub-pixels 31 is highlighted (i.e. shown white). The vectors x and y are the pixel pitch vectors of that grid as explained above. The lens grid 42 comprises a microlens array with spherical lenses 44 organized on a square grid. The vectors p' and q' are the pitch vectors of that grid. They are formed by a linear combination of the pixel pitch vectors.

Instead of physical lens pitch vectors in units of meters, logical and dimensionless lens pitch vectors can be defined as:

$p=(p_x,p_y)$ and $q=(-p_y,p_x)$ for chosen $p_x$ and $p_y$.

The geometric (physical) pitch vectors p' and q' (e.g. in meters) are defined in terms of the logical lens pitch vectors as:

$p'=Xp=p_x x+p_y y$, $q'=Xq=-p_y x+p_x Y$.

Deformations in the pixel grid should be reflected in equal deformations of the lens grid. Notice that $\langle p,q \rangle = 0$ but not necessarily $\langle p',q' \rangle = 0$ as we do not require $\langle x,y \rangle = 0$. Similarly $|p|=|q|$ but not necessarily $|p'|=|q'|$.

For the purposes of this description, regions are defined $P_{n,m}$ for integer values n and m. These regions consist of multiple circles, themselves organized on a grid of circles. Such a region is defined by:

$$P_{n,m} = \{p \mid \|p - v\| < r_{n,m} \forall v \in \mathcal{L}_{n,m}\} \text{ where}$$

$$\mathcal{L}_{n,m} = \left\{i + \frac{j}{n} \,\middle|\, i, j \in \mathbb{Z}^2 \wedge \langle j, j \rangle = m\right\}.$$

The p-v term specifies the length of the vector from v to p and thus the inequality defines a set of circles centered with a center defined by v. v is itself a set of vectors defined by the set of L terms. This has a discrete number of members as a result of the conditions placed on the integer values which make up the two dimensional vectors i and j.

Here $r_{n,m} = r_0 n^{-\gamma}$ is the radius of each circle. This radius thus decreases with increasing n. $\mathcal{L}_{n,m}$ is the set of centers, and $\langle i,i \rangle$ denotes the inner product, such that when $i=[i\ j]^T$ then $\langle i,i \rangle = i^2+j^2$. A shorthand $P_n=P_{n,n}$ is used in this description. Note that there are integers k for which there are no possible combinations of integers i and j for which $\langle j,j \rangle = k$ holds. As a consequence, the $P_3$, $P_6$ and $P_7$ sets are empty.

As an example, the set $P_5$ can be explored starting with $\mathcal{L}_{5,5}$.

With $i \in \mathbb{Z}^2$ we indicate all $i=[i\ j]^T$ where i and j are integers (negative, zero or positive). The set of solutions to $j \in \mathbb{Z}^2 \wedge \langle j,j \rangle = 5$ is:

$$j \in \left\{ \begin{bmatrix} -2 \\ -1 \end{bmatrix}, \begin{bmatrix} -2 \\ 1 \end{bmatrix}, \begin{bmatrix} -1 \\ -2 \end{bmatrix}, \begin{bmatrix} -1 \\ 2 \end{bmatrix}, \begin{bmatrix} 1 \\ -2 \end{bmatrix}, \begin{bmatrix} 1 \\ 2 \end{bmatrix}, \begin{bmatrix} 2 \\ -1 \end{bmatrix}, \begin{bmatrix} 2 \\ 1 \end{bmatrix} \right\}.$$

Figure 5:
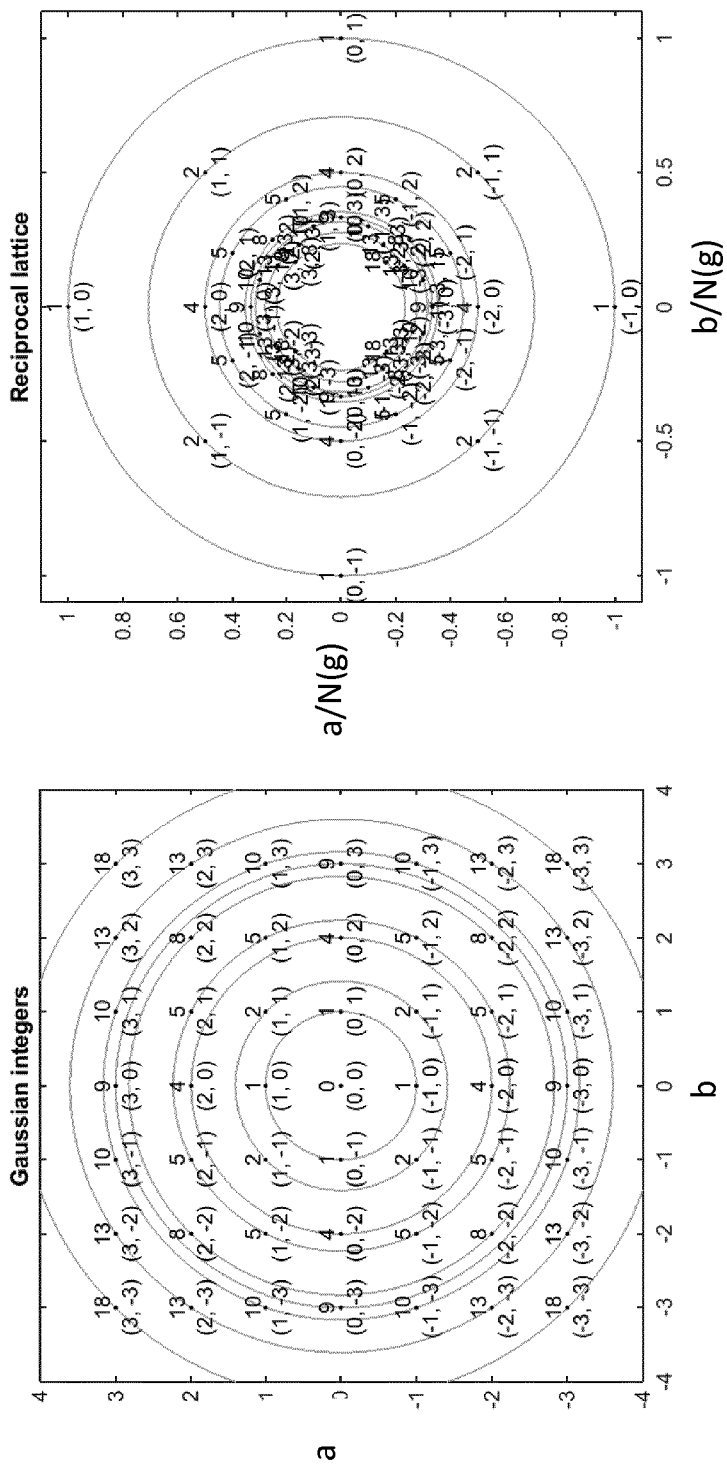
FIG. 5 is a graphical explanation for parameters used to characterize the pixel array and lens grid.

There is a graphical explanation of j and j/n as Gaussian integers and the reciprocal lattice thereof respectively shown in FIG. 5.

Each point in FIG. 5(a) is marked with the coordinate of the Gaussian integer $g=a+\tilde{i}b$ where $\tilde{i}^2=-1$ and the norm $N(g)=a^2+b^2$. FIG. 5(b) consists of the same points but the coordinates of the points are divided by their norm, thus corresponding to j/n instead of j.

Any combination $$i + \frac{j}{n}$$

from the set of solutions for j shown above is in $\mathcal{L}_{5,5}$. Two examples are $$\left[ 3\frac{2}{5}\ 2\frac{1}{5} \right]^T \text{ and } \left[ 1\frac{4}{5}\ \frac{2}{5} \right]^T.$$

The region $P_5$ then consists of circular regions with those centers and radius $r_5=r_0 5^{-\gamma}$. Note that there are eight $P_5$ circles around each $P_1$ circle because there are eight solutions to $j \in \mathbb{Z}^2 \wedge \langle j,j \rangle = 5$.

In order to minimize the problems of banding for rotatable displays with pixels on an approximately square grid a display design is presented in which an array of view forming arrangements (typically a micro-lens array) forms a square grid that can be described by the direction p in terms of pixel coordinates where p is chosen outside of regions $P_n$ that give rise to banding.

To analyze the banding problem, two models have been used. The first model is based on an analysis of the spatial frequencies in both the pixel structure and the lens structure and the second one is based on ray tracing.

The first model uses moiré equations and a visibility function to estimate the amount of visible banding for a given pitch vector p.

Figure 6:
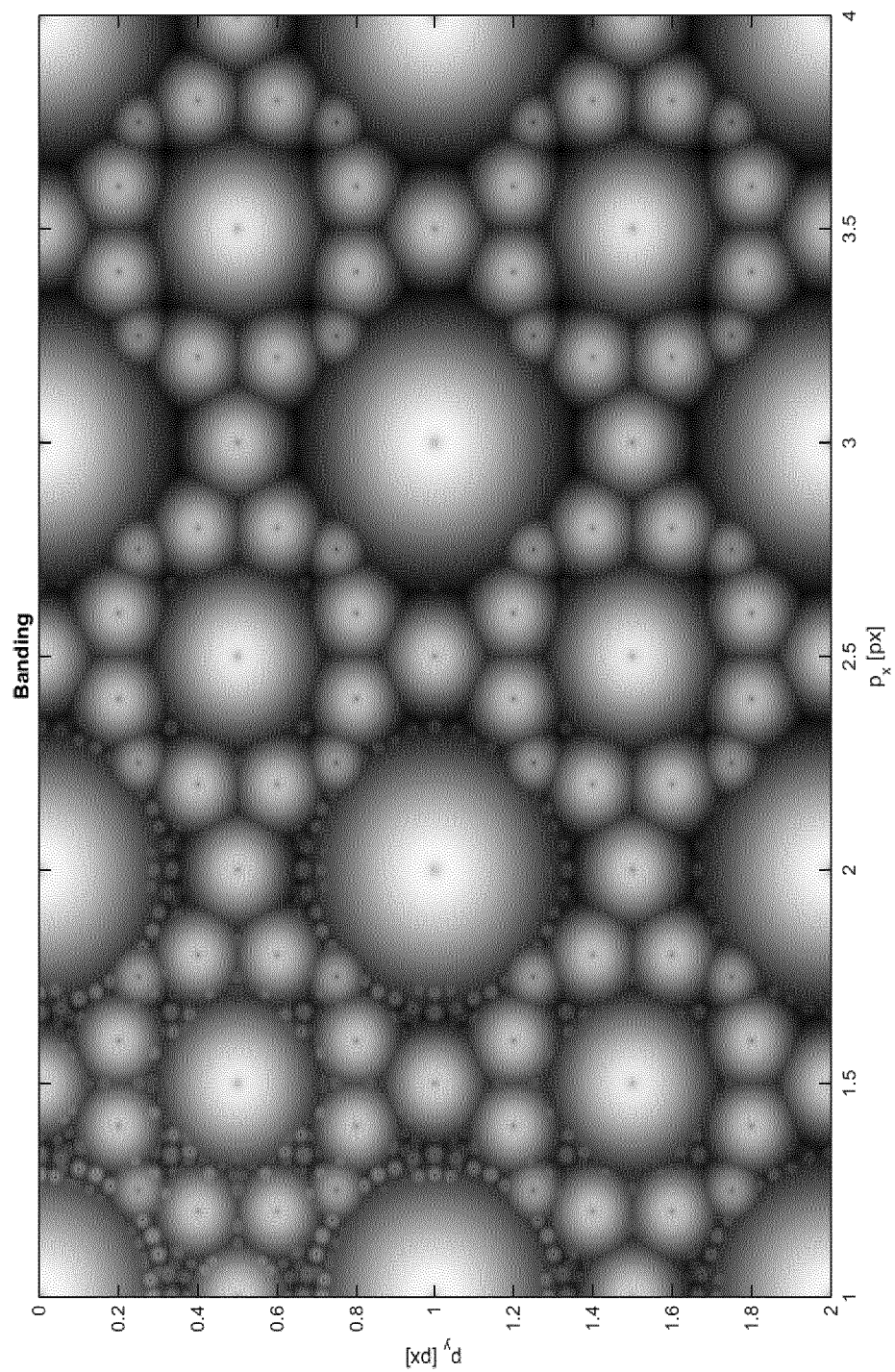
FIG. 6 shows a plot using moiré equations and a visibility function to estimate the amount of visible banding for a given pitch vector p.

This model results in a map such as FIG. 6 where brighter areas indicate more banding (on a log scale). FIG. 6 plots the $p_y$ versus $p_x$. It should be understood that the actual map depends on parameters such as the visual angle of the microlenses and the pixel structure. The map in FIG. 6 is generated for the case of a pixel with a single emitting area with aperture ⅛ of the whole pixel surface, a Gaussian lens point spread function (PSF) that scales with the lens aperture, and a constant lens visual angle of 20 arcsec.

As a consequence of the PSF scaling more banding components are visible for smaller |p| (in the top left part of FIG. 6) because of the more accurate focus. It has been observed that the strength of various banding "blobs" depends on the actual pixel structure (see FIG. 3) but the position of the blobs is always the same.

The analysis is based in part of the recognition that most of the structure in this banding map can be explained using the $P_n$ areas where $P_n$ with higher n correspond to smaller areas. Most of the areas with significant banding are explained by $P_1 \ldots P_8$.

Figure 7:
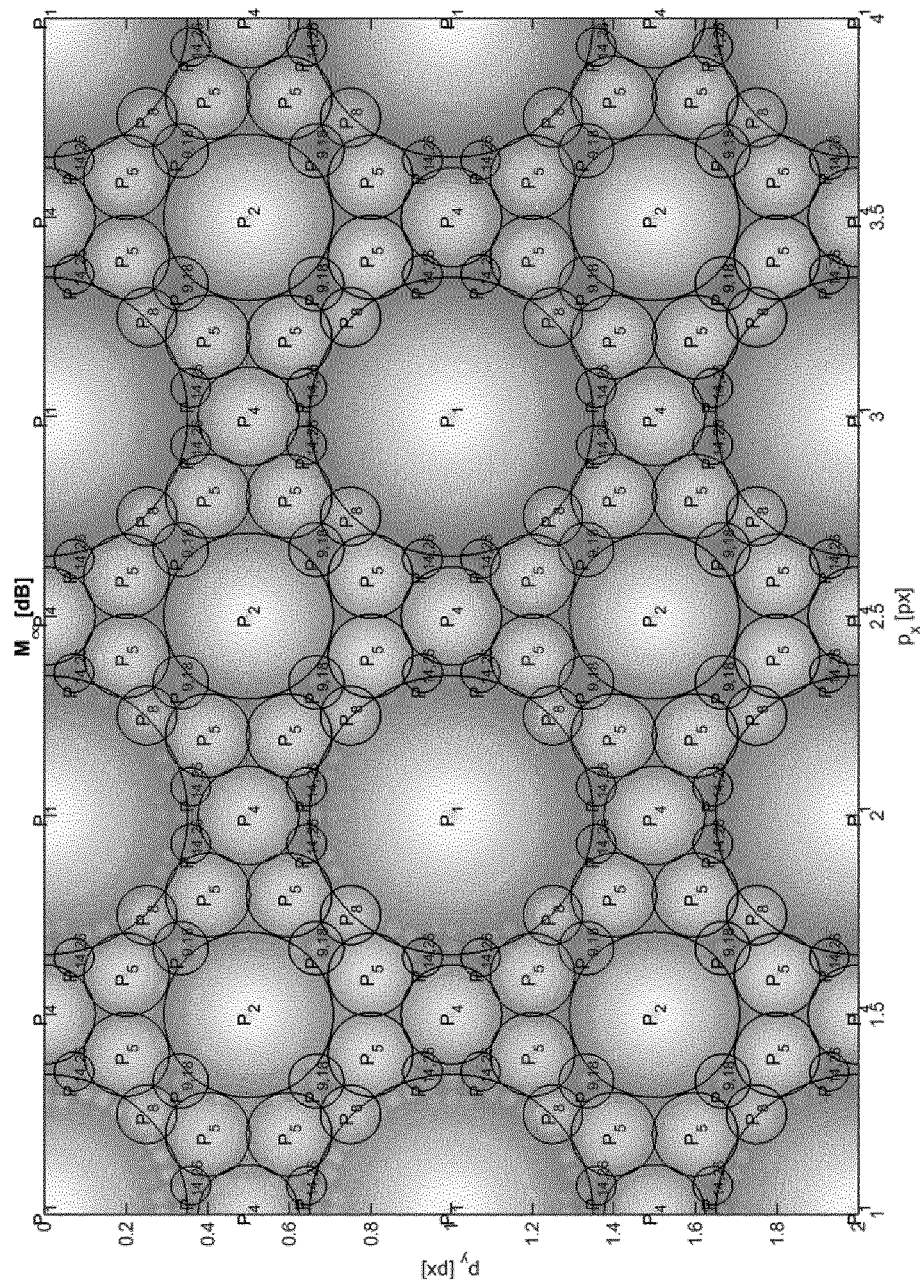
FIG. 7 shows a first possible characterization of regions from the plot of FIG. 6.
Figure 8:
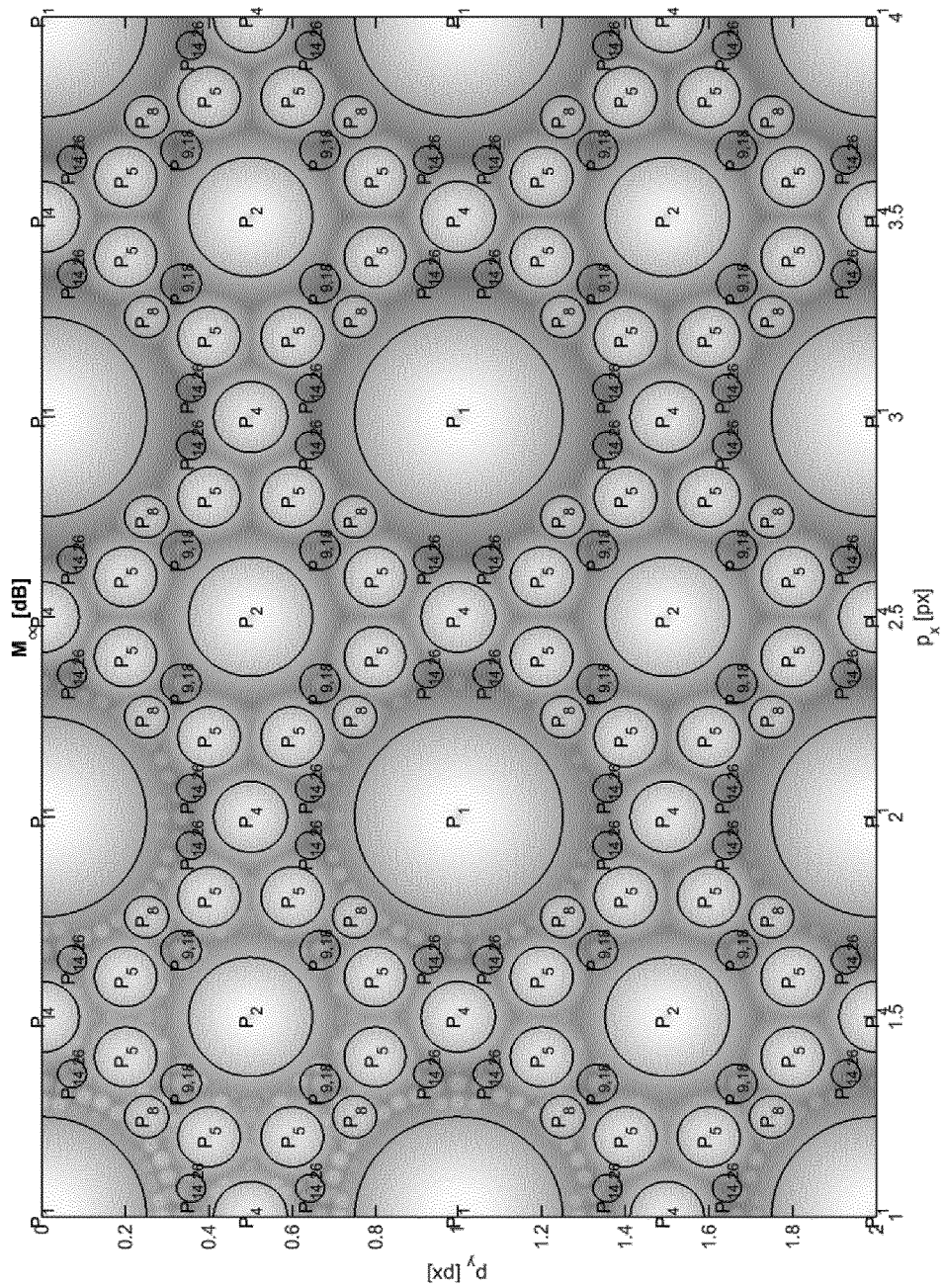
FIG. 8 shows a second possible characterization of regions from the plot of FIG. 6.

By fitting a radius $r_0=0.35$ and $\gamma=0.75$ to this map, the image shown in FIG. 7 results. In other situations there might be less banding and as a consequence $r_0=0.25$ is sufficiently stringent. FIG. 8 shows the results of fitting a radius $r_0=0.25$ to the map of FIG. 5.

In FIGS. 7 and 8, preferred regions are also plotted for the square grid examples, namely $P_{9,18}$ and $P_{14,26}$. These regions are best described by $r_0=0.35$.

The approach of this invention is based on avoiding the zones that give rise to banding, namely avoiding certain ranges of values of the vector $p=(p_x,p_y)$.

The first zones to avoid are the regions $P_1$ (i.e. $P_{1,1}$) which give rise to the greatest banding. In FIG. 8, with smaller radius values, the excluded zone is smaller. Thus, a first zone to exclude is based on $r_0=0.25$.

The zones to exclude when designing the relationship between the pixel grid and the lens grid for this square example are:
1. $p \notin P_1$ with radius $r_0=0.25$ and $\gamma=0.75$,
2. As directly above and also $p \notin P_2$,
3. As directly above and also $p \notin P_4$,
4. As directly above and also $p \notin P_5$,
5. As directly above and also $p \notin P_8$,
6. Any of the above but with radius $r_0=0.35$.

Within the space that is left by excluding the regions, there are some regions that are of particular interest because banding is especially low for a wide range of parameters. These regions are:
1. $p \in P_{9,18}$ with radius $r_0=0.35$,
2. $p \in P_{14,26}$ with radius $r_0=0.35$.

Preferably, for the square grid example, the sub-pixels are on a perfectly square grid but small variations are possible. The aspect ratio is preferably limited to $$\frac{2}{3} \leq a \leq \frac{3}{2},$$

or more preferably to $$\frac{5}{6} \leq a \leq \frac{6}{5}.$$

The sneer of me grid from a square/rectangle to a rhombus/parallelogram is preferably to $|\theta-90°| \leq 20°$, or even to $|\theta-90°| \leq 5°$.

An alternative for moiré equations to illustrate the approach is to ray trace a model of a display with a lens that displays a fully white image.

Figure 9:
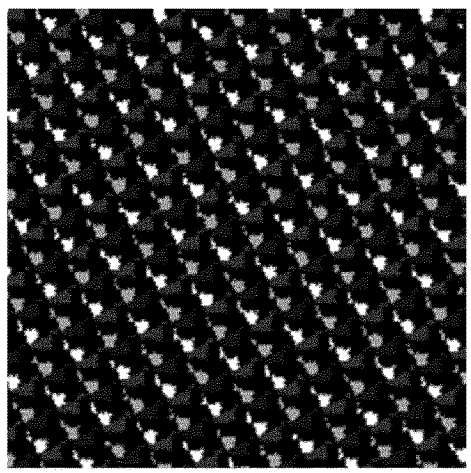
FIGS. 9a-d shows ray trace rendering simulations of the 3D pixel structure for the 2D pixel layout of FIG. 3(c) for different lens designs.
Figure 9:
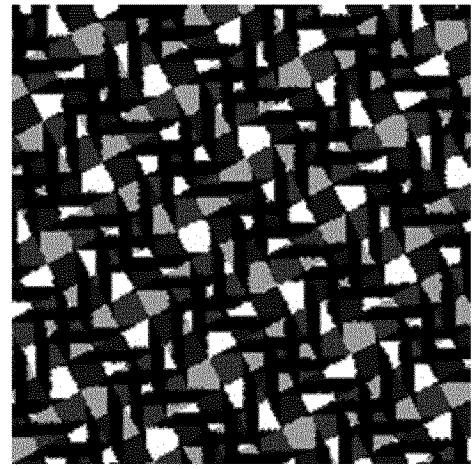
Figure 9:
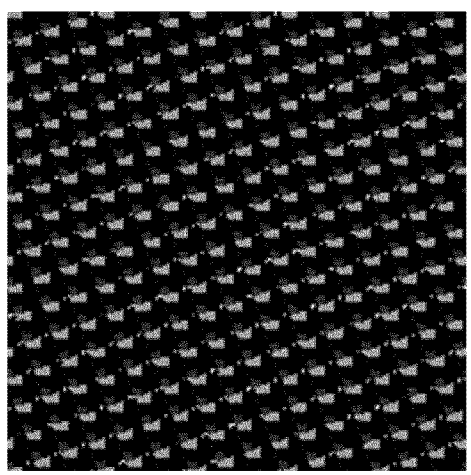
Figure 9:
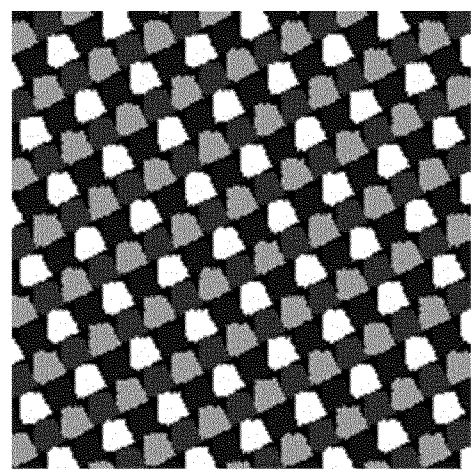

FIG. 9 shows such rendering for the 2D pixel layout as of FIG. 3(c). Any rendering of a banding-free design would appear to be on average white, while for a design with banding, the intensity and/or color depend on the viewer position (i.e. the lens phase).

FIG. 9(a) shows renderings for a lens design in a $P_1$ region for a lens phase. Although not shown in the rendition of FIG. 9(a), the white and most of the blue primary is missing. FIG. 9(b) shows renderings for a lens design in a $P_2$ region for a lens phase where more than average amount of black matrix is visible. FIG. 9(c) shows renderings for a lens design in a $P_4$ region for a lens phase where almost no black matrix is visible. FIG. 9(d) shows renderings for a lens design at a $P_{14,26}$ center with (virtually) equal distribution of primaries within this patch for this and all other phases.

A patch such as shown in FIG. 9 can be rendered for various lens phases, since different lens phases (by which is meant lens position which is responsible for generating the view to a particular viewing location) give rise to different distributions of sub-pixels. More effective is to compute the mean CIE 1931 XYZ color value is computed for each such patch. From that mean, the CIE L*a*b* color value can be computed which gives quantitative means of comparing perceptual banding effects.

In this perceptual color space the $L_2$ distance between two color values (denoted ΔE below) is indicative of the perceived difference between those colors.

The target is white corresponding to (L*, a*, b*)=(100, 0, 0).

Figure 10:
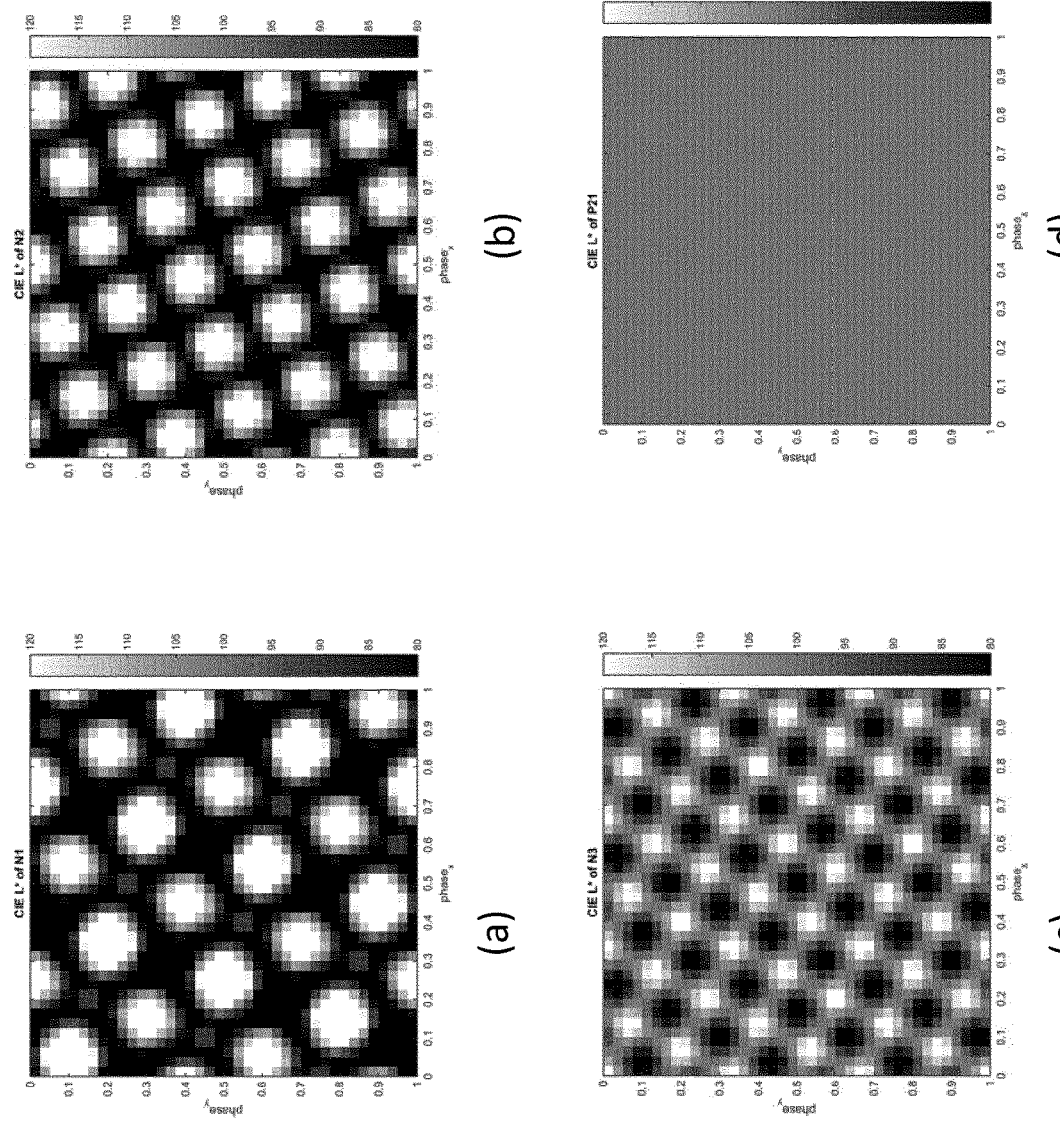
FIG. 10a-d is a plot of the lightness (L*) as a function of the lens phases in two dimensions, for the same examples as in FIGS. 9a-d.

In FIG. 10 the brightness (L*) is plotted as a function of the lens phases in two dimensions, corresponding to different views projected by the lenses to different viewer positions, for the same examples as in FIG. 9. The dimensionless lens phase variable has values in the range of (0,1). Due to the periodicity of the pixel grid and the lens grid, lens phases 0 and 1 correspond to the same generated views. Because the display uses a 2D microlens array, the lens phase itself is also 2D.

Figure 11:
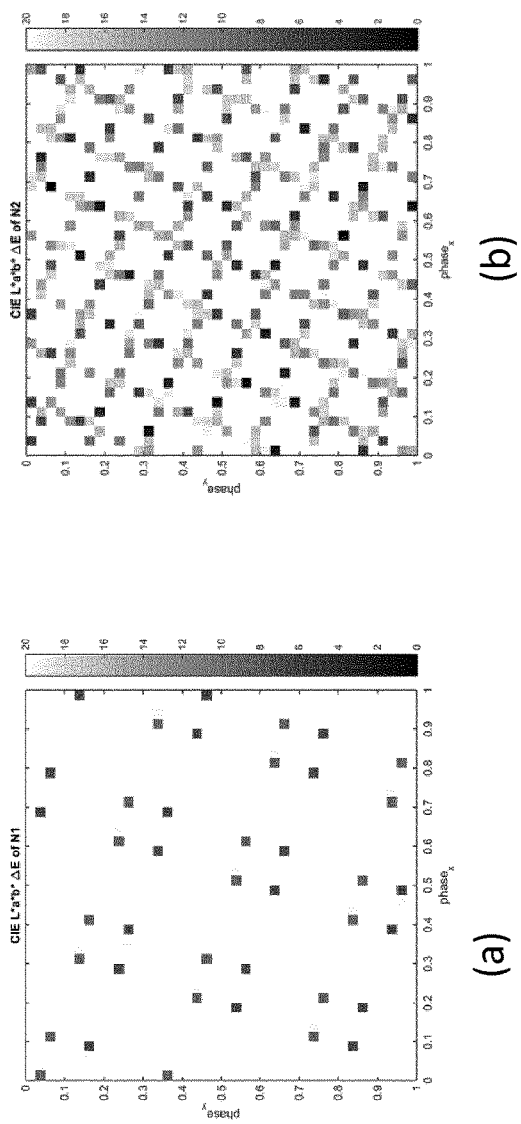
FIGS. 11a-d shows a plot of the color deviation for the same examples as in FIG. 9a-d.
Figure 11:
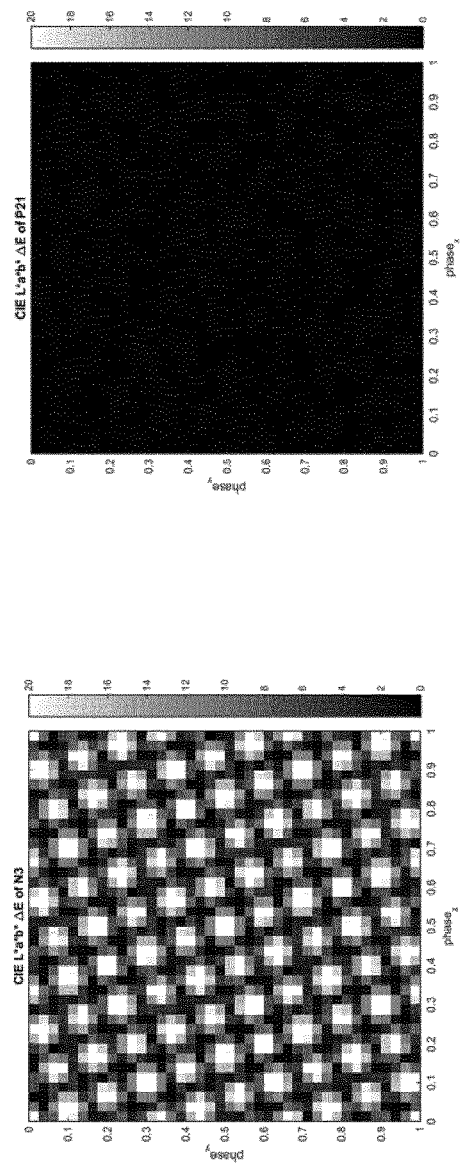

In FIG. 11, the color error (ΔE) is plotted again for the same examples.

Depending on the situation ΔE≈1 is just visible. The banding-free example in FIGS. 10(d) and 11(d) appears as uniform L*=100 and ΔE=0 respectively, while the other examples clearly have banding as the color varies with the viewer position (i.e. lens phase).

Because the display uses a 2D microlens array, the lens phase itself is also 2D.

The plots can be summarized by taking the root-mean-square (RMS) value of ΔE over the entire phase space.

In the table below, this has been done for a list of points that correspond to regions that according to the banding model explained above should be excluded or included.

| Region | $p_x$ | $p_y$ | $\Delta E_{RMS}$ |
| --- | --- | --- | --- |
| $P_1$ | 6.000 | 2.000 | 111.576 |
| $P_2$ | 7.000 | 3.000 | 63.375 |
| $P_4$ | 6.000 | 3.000 | 12.723 |
| $P_5$ | 7.200 | 3.600 | 3.609 |
| $P_5$ | 7.600 | 3.200 | 5.738 |
| $P_8$ | 6.500 | 2.500 | 2.289 |
| $P_8$ | 4.500 | 4.500 | 1.495 |
| $P_{9,18}$ | 7.333 | 3.333 | 0.467 |
| $P_{9,18}$ | 2.600 | 2.600 | 1.308 |
| $P_{9,18}$ | 3.350 | 3.350 | 0.796 |
| $P_{9,18}$ | 3.400 | 3.400 | 0.871 |
| $P_{14,26}$ | 6.143 | 3.286 | 0.180 |
| $P_{14,26}$ | 7.286 | 2.143 | 0.185 |
| In between two $P_{14,26}$ circles | 6.000 | 3.286 | 0.155 |
| In between two $P_5$ circles | 7.000 | 3.600 | 0.611 |
| In between two $P_5$ circles | 5.000 | 3.400 | 0.289 |

From this table it is clear that the two models are largely consistent in terms of banding prediction. The positive areas have low $\Delta E_{RMS}$ values, and the biggest negative areas (with lowest ordinals) have the highest $\Delta E_{RMS}$ values.

The first model above provides an overview of the banding effect, while the second model provides more details and visualization.

An analogous analysis will now be presented for the example of a hexagonal pixel grid.

This invention relates specifically to panels with pixels (or sub-pixels) on a hexagonal grid (which is preferably a regular hexagonal grid, although it may deviate from a regular grid) on top of which there is a view forming arrangement that also has elements on a hexagonal grid.

As in the example above, the coordinate system of the panel is defined, then the coordinate system of the view forming arrangement is defined in terms of geometric (physical) coordinates and logical coordinates that are relative to the coordinate system of the panel. Parametric regions in the parameter space are again defined which can be selected to achieve desired performance, for example with respect to banding.

Pixel pitch vectors are again defined and for this example vectors a and b are defined, analogous to the vectors x and y in the example above.

Vectors a and b, are the pixel pitch vectors which form a lattice matrix X=[a b] with length units (e.g. meters). There are multiple possible definitions of a pixel including the smallest unit cell, however for this invention the pixel grid is hexagonal, for example at least approximately regular hexagonal. Therefore X should be chosen to form an hexagonal region of sub-pixels.

Figure 12:
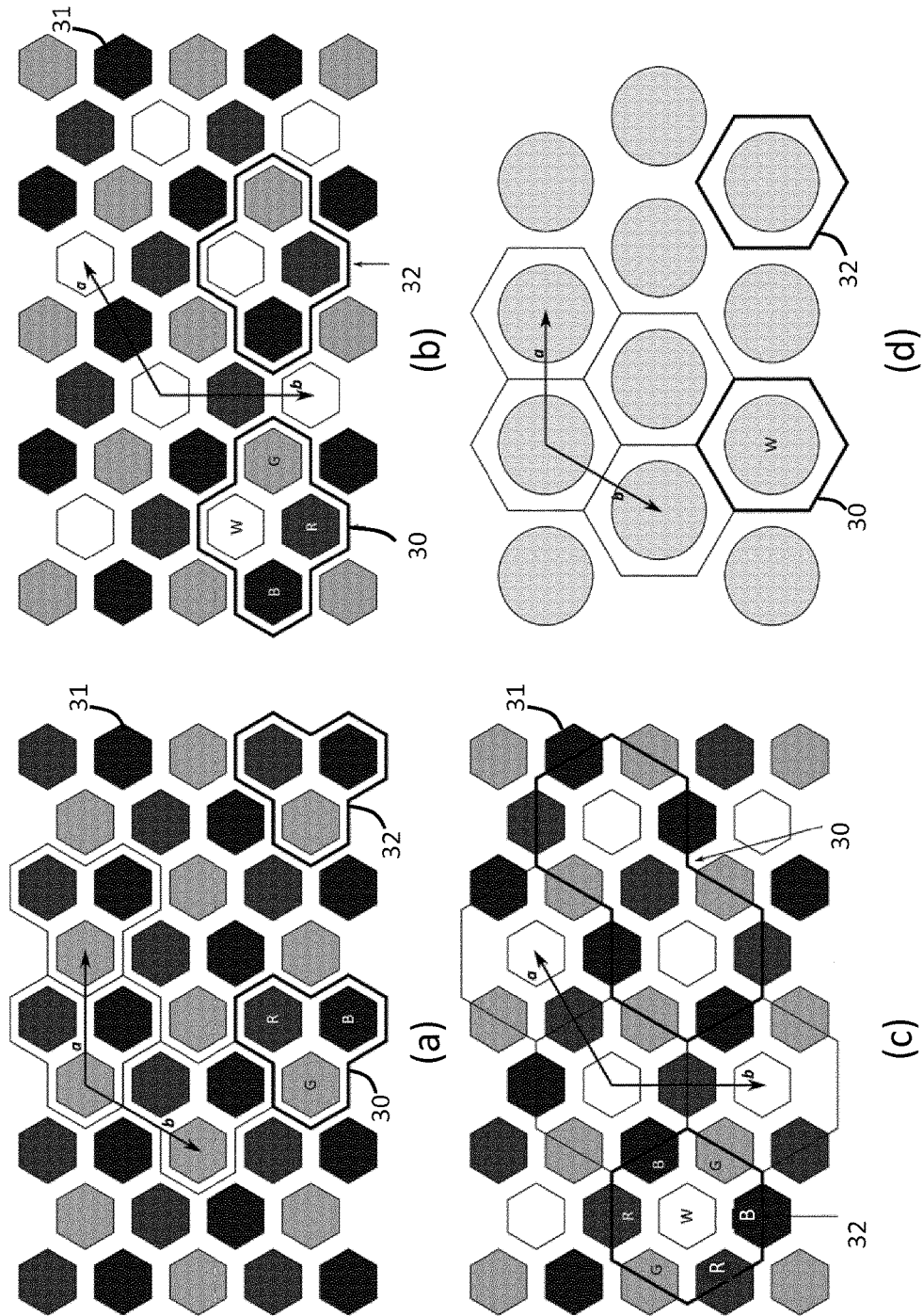
FIGS. 12a-d shows various possible pixel grids based on hexagonal pixel and lens grids.

Examples are shown in FIG. 12.

For color displays the pixel area 32 is most likely a triangular region with 3 or maybe 4 sub-pixels 31. Sometimes such a group appears rotated or mirrored to form a larger and possibly elongated unit cell, but also in that case X is a region with 3 or 4 sub-pixels 31. For monochrome displays, the unit cell 30 is the region of a single pixel 32. Important is the grid of pixels 32 rather than the shape or grid of sub-pixels 31.

FIG. 12(a) shows a hexagonal grid in which each pixel 32 is formed as a triangle of three RGB sub pixels 31. The unit cell 30 is the same.

FIG. 12(b) shows a hexagonal grid in which each pixel 32 is formed as group of four RGBW sub pixels 31, forming a shape which is essentially a rhombus (but without straight sides). The unit cell 30 is the same.

FIG. 12(c) shows a hexagonal grid in which each pixel 32 is formed from seven sub pixels 31 (one in the center and six around the outside). However, the outer sub-pixels are shared with adjacent pixels so that on average there are 4 (RGBW) sub-pixels per pixel. The unit cell 30 (the smallest element which can be translated to form the full overall sub-pixel pattern) is larger, because there are two types of pixel.

FIG. 12(d) shows a hexagonal grid of single color pixels. The unit cell 30 is a single pixel 32.

Figure 13:
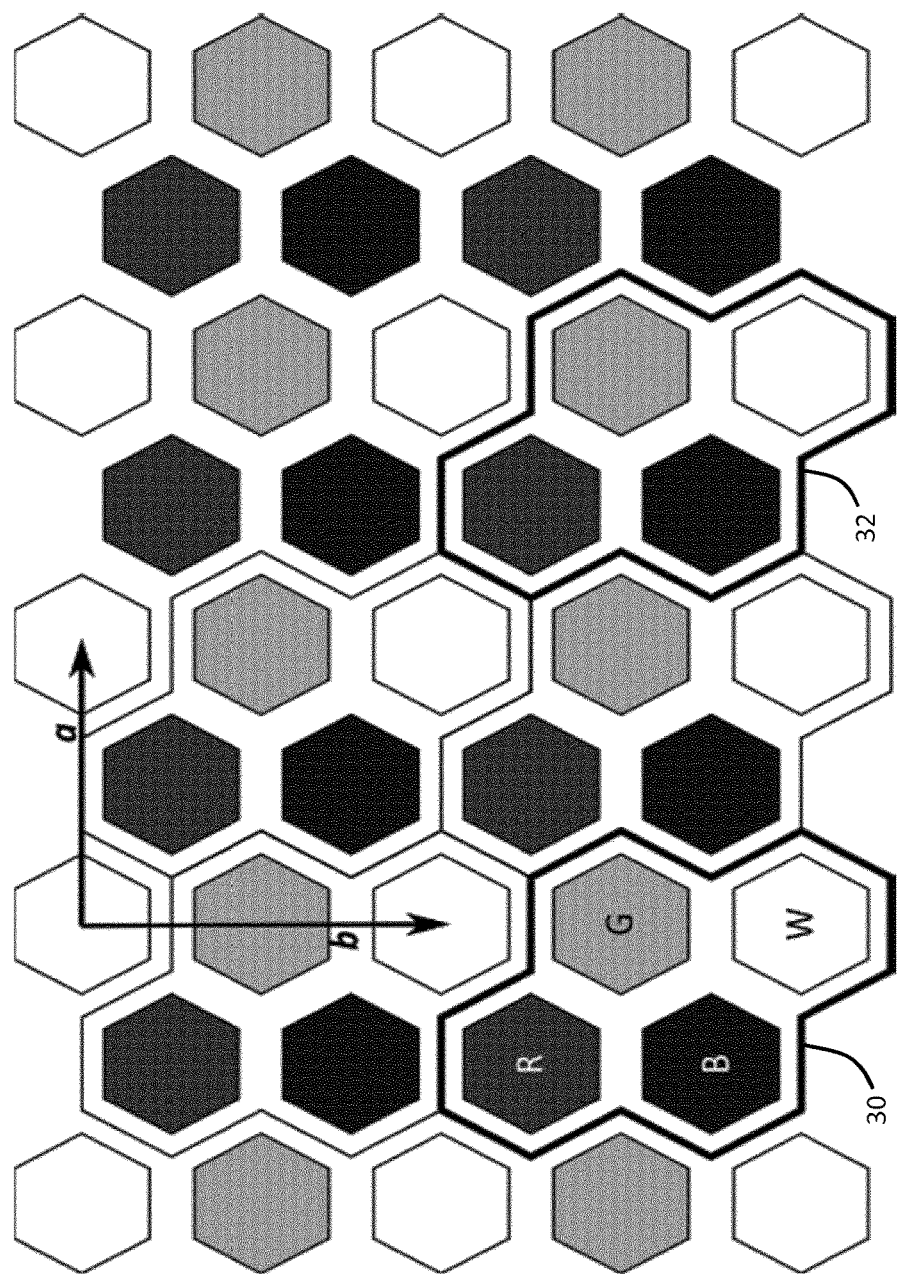
FIG. 13 shows a pixel grid based on hexagonal sub-pixels but which in fact form a rectangular grid.

The layout of FIG. 13 is a counter example because although the sub-pixels are hexagons and are arranged on a hexagonal grid, the pixel grid is actually rectangular. The pixel grid is defined by vectors which translate from one pixel to the same location within the adjacent pixels.

As in the example above, the invention does not require perfectly hexagonal grids nor is the angular orientation relevant. A rotation over any angle, a limited sheer or limited elongation is also possible.

The aspect ratio for the hexagonal pixel grid is defined as $$\beta = \frac{|a|}{|b|}$$

and the angle of the grid is:

$$\theta = \cos^{-1} \frac{\langle a, b \rangle}{\sqrt{\langle a, b \rangle \langle a, b \rangle}}.$$

An interior angle of 120 corresponds to a regular hexagonal grid. An amount of sheer can thus be expressed as $|\theta-120°|$. Hence for an approximately regular hexagonal grid it holds that $\beta \approx 1$ and $|\theta-120°| \approx 0°$.

Figure 14:
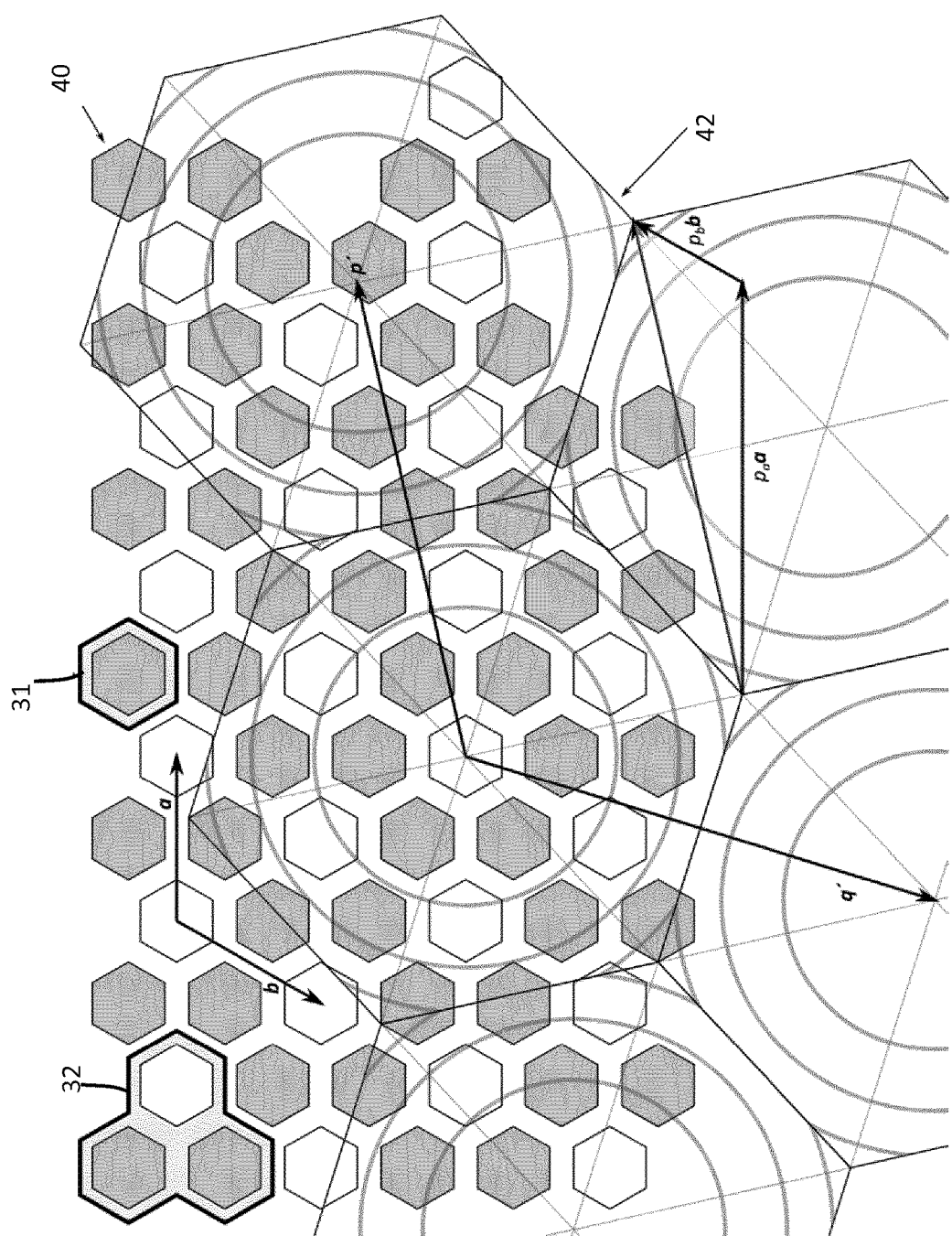
FIG. 14 shows a hexagonal lens grid overlaid over a hexagonal pixel array, with a pitch vector p defining the relationship between them.

As in the example above, lens pitch vectors are also defined. The definition of the logical and dimensionless lens pitch vectors are $p=(p_a, p_b)$ for chosen $p_a$ and $p_b$ The vectors relevant to the hexagonal case are shown in FIG. 14, which like FIG. 4 shows the lens grid 42 over the pixel array 40. This is based on the three sub-pixel pixel of FIG. 12(*a*). The lens grid is formed by the real vectors p' and q'.

The vectors p' and q' have the same length and the angle between p' and q' is 120°. The geometric (physical) pitch vectors p' and q' (e.g. in meters) are defined in terms of the logical lens pitch vectors where deformations (e.g. rotation, sheer, scaling) in the pixel grid should be reflected in equal deformations of the lens grid. This can be understood by considering a flexible autostereoscopic display being stretched.

The dimensionless pitch vector p again defines a mapping between the pixel grid and the lens grid and in this case is defined by:

$$p'=p_a a + p_b b,$$

For this example regions $E_n$ are defined for integers n that consist of multiple circles, themselves organized on a grid of circles. Such regions are defined by:

$$E_n = \{p \mid N(p-v) < r_n^2 \forall v \in \Gamma_n\}$$

where $$\Gamma_n = \left\{ i + \frac{j}{n} \mid i, j \in \mathbb{Z}^2 \wedge N(j) = n \right\}.$$

Again $r_n = r_0 n^{-\gamma}$ is the radius of each circle, $\Gamma_n$ is the set of centers, and N(j) is the norm akin the Eisenstein integer norm defined as:

$$N\left(\begin{bmatrix} a \\ b \end{bmatrix}\right) = a^2 - ab + b^2.$$

This defines a hexagonal lattice of centers. As in the example above, the p-v term specifies the vector from v to p and thus the inequality, which is essentially based on the norm of the space (distance squared), This defines a set of circles with a center defined by v. v is itself a set of vectors defined by the set of $\Gamma_n$ terms. This has a discrete number of members as a result of the conditions placed on the integer values which make up the two dimensional vectors i and j.

As an example, explore $E_4$ is considered, starting with $\Gamma_4$. The set of solutions to $j \in \mathbb{Z}^2 \wedge N(j)=4$ is:

$$j \in \left\{ \begin{bmatrix} -2 \\ -2 \end{bmatrix}, \begin{bmatrix} -2 \\ 0 \end{bmatrix}, \begin{bmatrix} 0 \\ -2 \end{bmatrix}, \begin{bmatrix} 0 \\ 2 \end{bmatrix}, \begin{bmatrix} 2 \\ 0 \end{bmatrix}, \begin{bmatrix} 2 \\ 2 \end{bmatrix} \right\}.$$

Any combination $$i + \frac{j}{4}$$

is in $\Gamma_4$. Two examples are $$\begin{bmatrix} 3\frac{1}{2} & 2\frac{1}{2} \end{bmatrix}^T \text{ and } \begin{bmatrix} 1 & 2\frac{1}{2} \end{bmatrix}^T.$$

Figure 15:
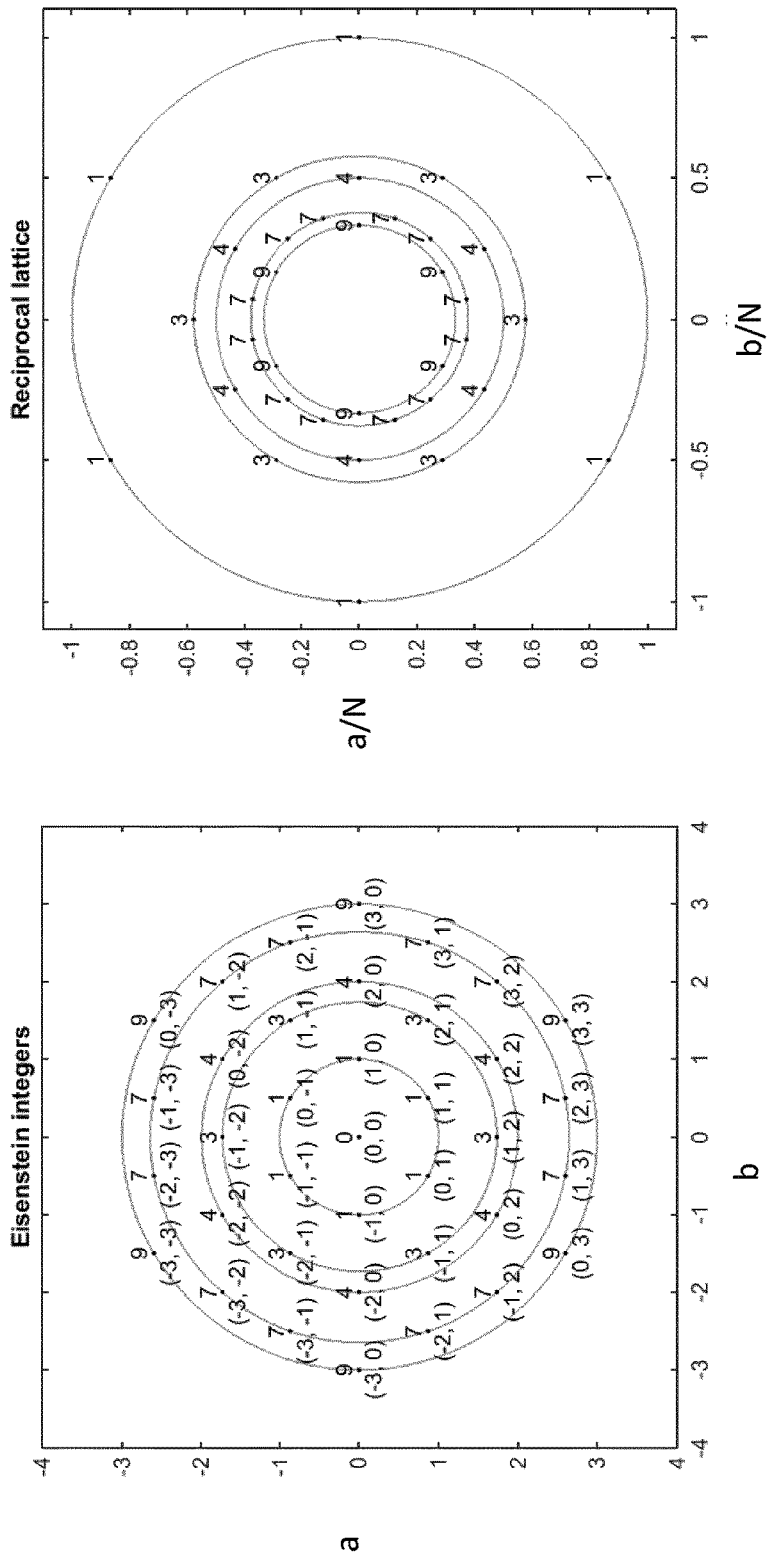
FIG. 15 is a first graphical explanation for parameters used to characterize the pixel array and lens grid.

The region $E_4$ then consists of circular regions with those centers and radius $r_4 = r_0 4^{-\gamma}$. There is a graphical explanation of j and j/n as Eisenstein integers (that form a hexagonal lattice in the complex plane) and the reciprocal lattice thereof respectively as shown in FIG. 15.

Each point in the left subfigure is marked with the coordinate of the Eisenstein integer $c=a+\omega b$, and the norm $N([a \; b]^T)$. The right subfigure consists of the same points but divided by their norm, thus corresponding to j/n instead of j.

Again there are integers k for which there are no j for which N(j)=k holds. As a consequence, the $E_2$, $E_5$ and $E_6$ sets are empty.

Figure 16:
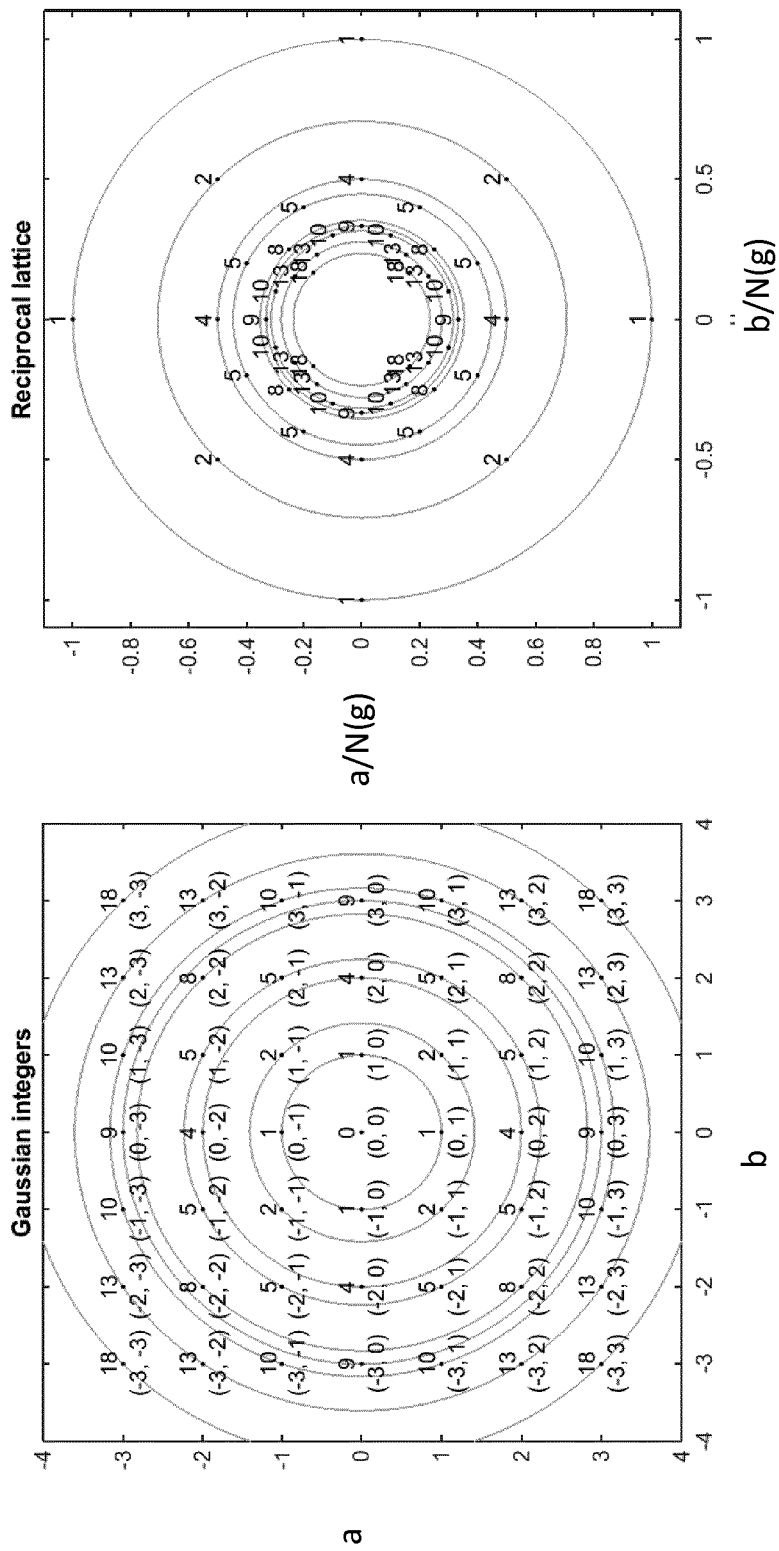
FIG. 16 is a second graphical explanation for parameters used to characterize the pixel array and lens grid which corresponds to the representation in FIG. 5.

In the example above based on square grids, a Cartesian norm is used, namely $\langle j,j \rangle = j^T j$ and in a graphical explanation Gaussian integers are used that from a square lattice in the complex plane, instead of Eisenstein integers. FIG. 16 shows this approach for comparison with FIG. 5.

Figure 17:
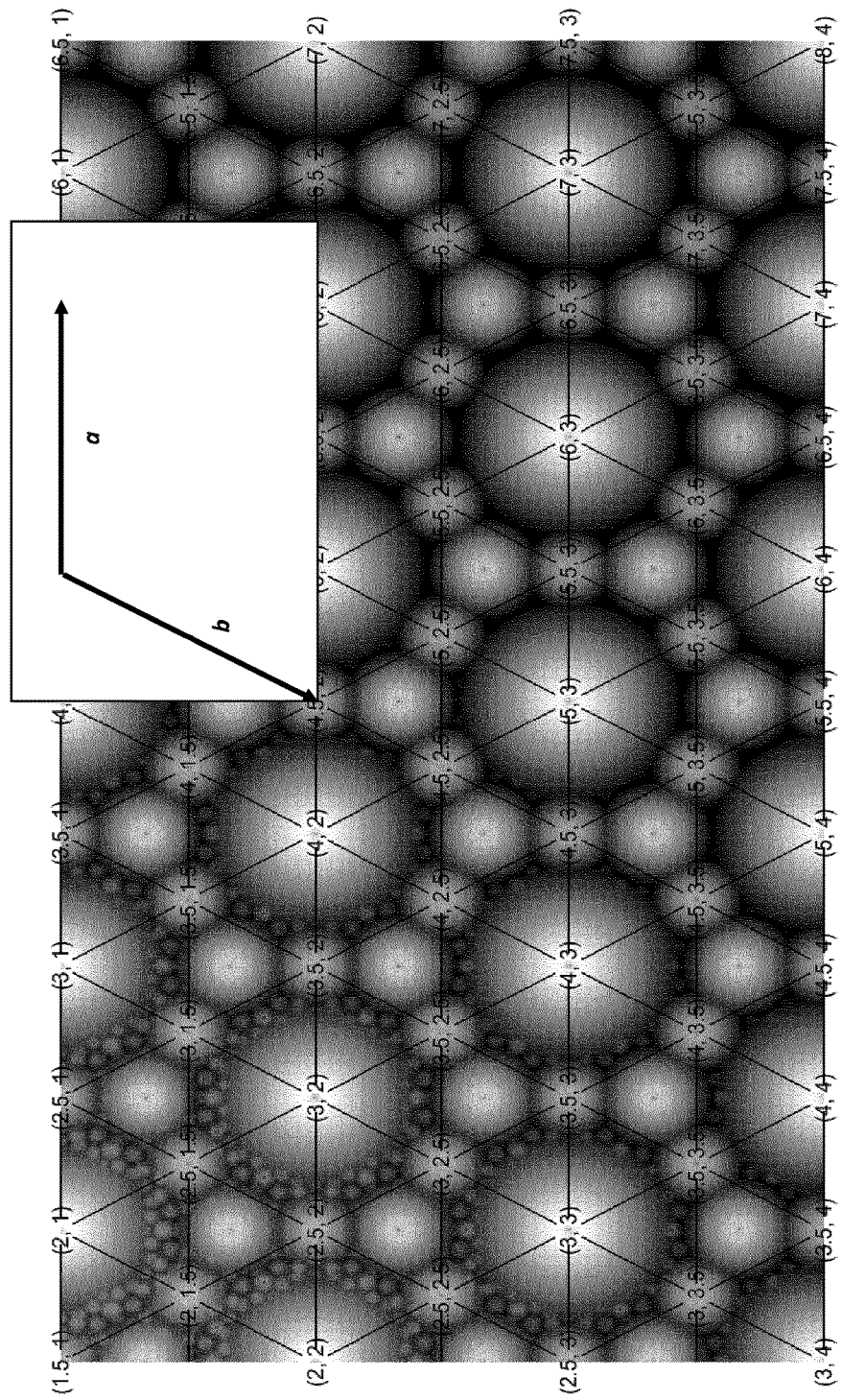
FIG. 17 shows a plot using moiré equations and a visibility function to estimate the amount of visible banding for a given pitch vector p.

The approach explained above is used to analyze the banding effect of different designs. The resulting map, again based on moiré equations and a visibility function to estimate the amount of visible banding for a given pitch vector p, is shown in FIG. 17. This is a plot of $p_b$ versus $p_a$ and again brighter areas indicate more banding.

It should be understood that the actual map depends on parameters such as the visual angle of the microlenses and the pixel structure. The map in FIG. 17 is generated for the case of a pixel with a single emitting area with aperture ⅙ of the whole pixel surface, a Gaussian lens point spread function (PSF) that scales with the lens aperture, and a constant lens visual angle of 20 arcsec. As a consequence of the PSF scaling more banding components are visible for smaller |p| because of the more accurate focus.

Most of the structure in this banding map can be explained using the $E_n$ areas where $E_n$ with higher n correspond to smaller areas. Most of the areas with significant banding are explained by $E_1 \ldots E_4$.

Figure 18:
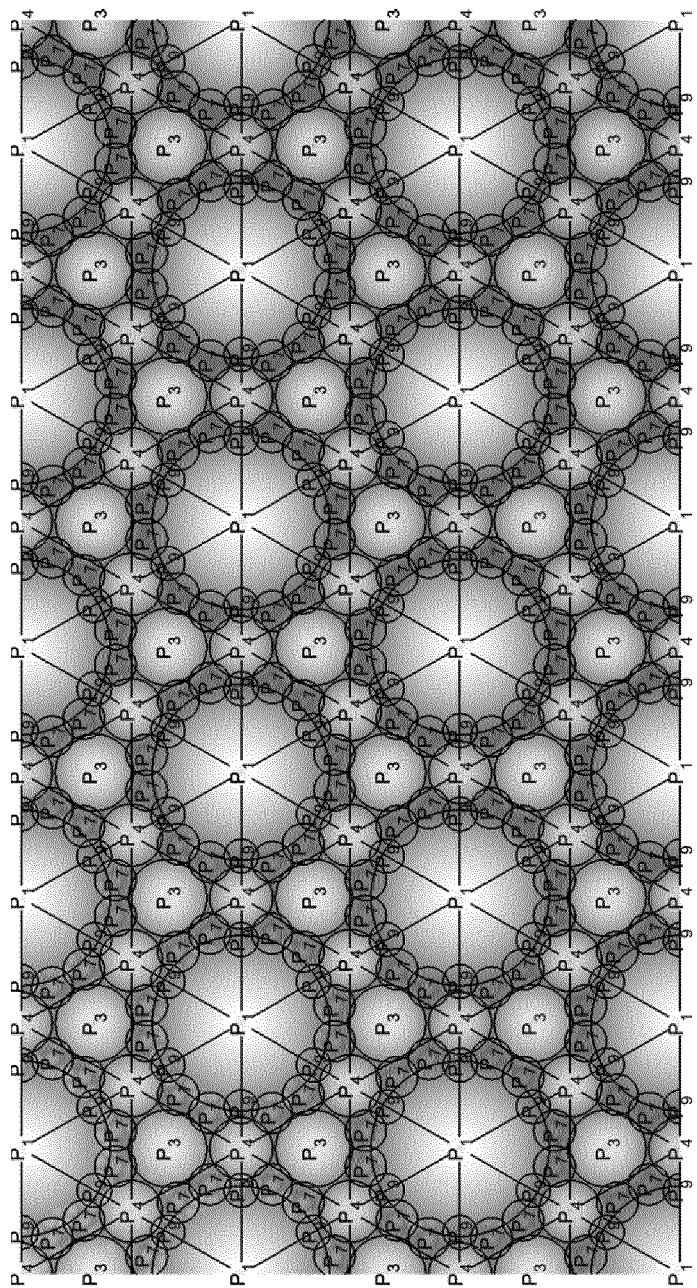
FIG. 18 shows a first possible characterization of regions from the plot of FIG. 17.
Figure 19:
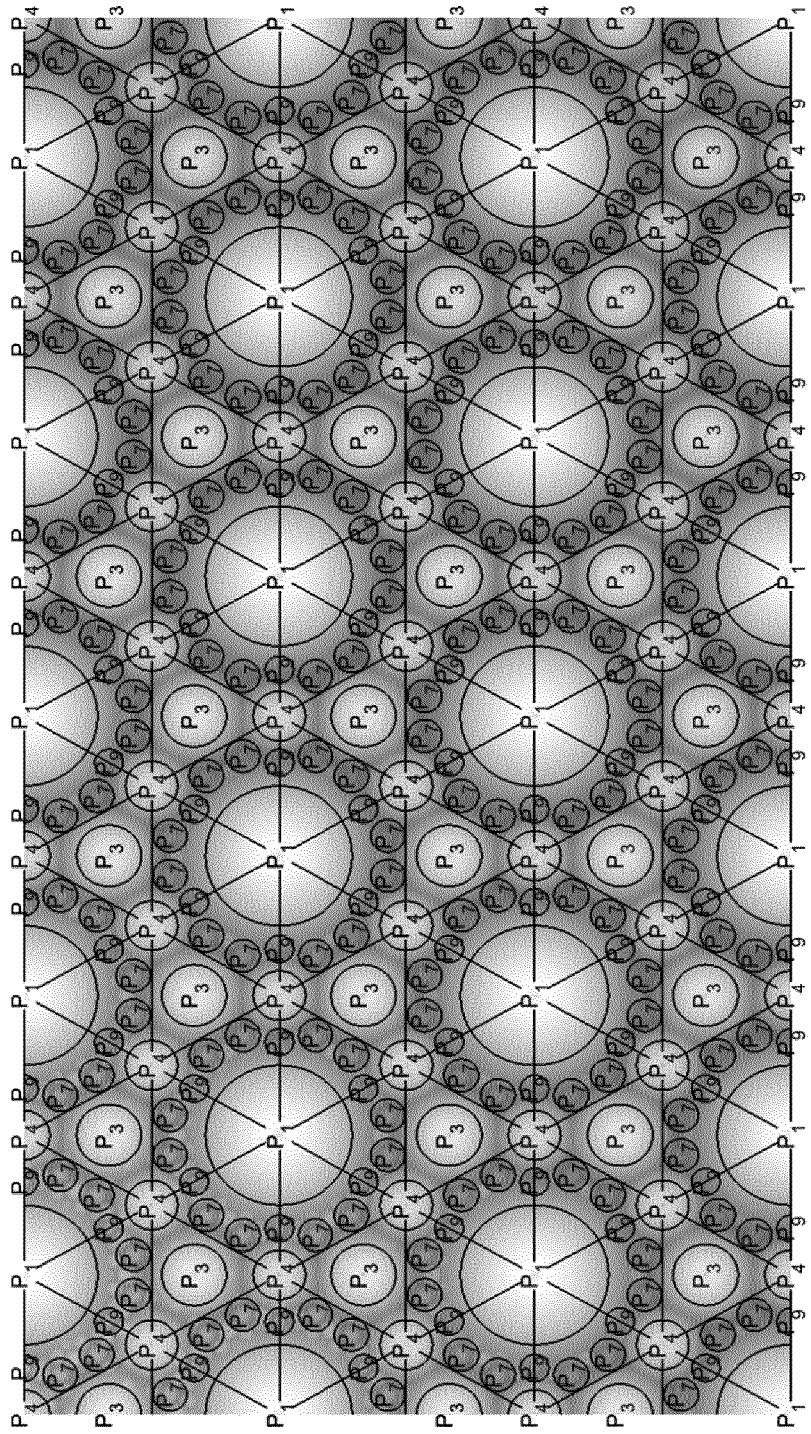
FIG. 19 shows a second possible characterization of regions from the plot of FIG. 17.

As in the examples above, $r_0=0.35$ and $\gamma=0.75$ are used to generate the image of FIG. 18. In other situations there might be less banding and as a consequence $r_0=0.25$ is sufficiently stringent. FIG. 19 shows the results of fitting a radius $r_0=0.25$ to the map of FIG. 17.

Note that in FIGS. 18 and 19, the regions are labeled $P_x$ for simple comparison with FIGS. 7 and 8. These regions however are the regions $E_x$ as defined by the equations above.

In FIGS. 18 and 19, preferred regions are plotted, namely $E_7$ and $E_9$ (shown as $P_7$ and $P_9$). These regions are best described by $r_0=0.35$.

The invention is based on avoiding the zones that give rise to banding, namely the value of the vector $p=(p_a, p_b)$.

The first zones to avoid are the regions $E_1$ which give rise to the greatest banding. In FIG. 19, with smaller radius values, the excluded zone is smaller. Thus, a first zone to exclude is based on $r_0=0.25$.

The zones to exclude when designing the relationship between the pixel grid and the lens grid are:
1. p∉$E_1$ with radius $r_0$=0.25 and γ=0.75,
2. As directly above and also p∉$E_3$,
3. As directly above and also p∉$E_4$,
4. Any of the above but with radius $r_0$=0.35.

Within the space that is left by excluding the regions, there are some regions that are of particular interest because banding is especially low for a wide range of parameters. These regions are:
1. p∈$E_7$ with radius $r_0$=0.35,
2. p∈$E_9$ with radius $r_0$=0.35.

Preferably, sub-pixels are on a regular hexagonal grid but small variations are within the scope of the invention: The aspect ratio is preferably limited to $$\frac{2}{3} \le a \le \frac{3}{2},$$

or more preferably to $$\frac{5}{6} \le a \le \frac{6}{5}.$$

The sheer of the grid away from a regular hexagon is preferably limited to |θ−120°|≤20°, or even to |θ−120°|≤5°.

The invention is applicable to the field of autostereoscopic 3D displays, more specifically to full-parallax rotatable multi-view auto-stereoscopic displays.

The invention relates to the relationship between the pixel grid and the lens grid. It can be applied to any display technology.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An autostereoscopic display, comprising:
a pixelated display panel, pixelated display panel comprising an array of single color pixels or an array of sub-pixels of different colors, wherein each group sub-pixels define full color pixels; and
a view forming arrangement, wherein the view forming arrangement is positioned over the display panel,
wherein the view forming arrangement is arranged to direct light the light from different pixels or sub-pixels to different spatial locations, thereby enabling different views of a three dimensional scene to be displayed in different spatial locations,
wherein the pixels of the display panel form a hexagonal grid, with a maximum internal angle deviation from 120 degrees of 20 degrees or less,
wherein the hexagonal grid repeats with translation vectors a and b, and the lengths of the translation vectors a and b have an aspect ratio of the shorter to the longer between 0.66 and 1;
wherein the view forming arrangement comprises a two dimensional array of lenses which repeat in a hexagonal grid with translation vectors p' and q';
wherein defining a dimensionless vector p as ($p_a$,$p_b$), which satisfies:

$$p' = p_a a + p_b b,$$

and defining circular regions in the space of components $p_b$ and $p_a$ for integer n as:

$$E_n = \{p \mid N(p-v) < r_n^2 \forall v \in \Gamma_n\}$$

where $$\Gamma_n = \left\{ i + \frac{j}{n} \mid i, j \in \mathbb{Z}^2 \wedge N(j) = n \right\}$$

where n is an integer number,
with $r_n = r_0 n^{-\gamma}$ defining the radius of each circle, $\Gamma_n$ defining the circle centers, and with N comprising a vector function for two coordinate vectors defined as:

$$N\left(\begin{bmatrix} a \\ b \end{bmatrix}\right) = a^2 - ab + b^2,$$

the translation vectors a, b, p' and q' are selected with values such that p falls in a vector space, wherein the vector space excludes the sets $E_1$, $E_3$ or $E_4$ with $r_0$=0.1 and γ=0.75.

2. The display as claimed in claim 1, wherein the translation vectors a, b, p' and q' have values such that p falls in the vector space which excludes the set $E_1$ with $r_0$=0.25 and γ=0.75.

3. The display as claimed in claim 1, wherein the translation vectors a, b, p' and q' have values such that p falls in the vector space which excludes the set $E_3$ with $r_0$=0.25 and γ=0.75.

4. The display as claimed in claim 1, wherein the translation vectors a, b, p' and q' have values such that p falls in the vector space which excludes the set $E_4$ with $r_0$=0.25 and γ=0.75.

5. The display as claimed in claim 1, wherein the translation vectors a, b, p' and q' have values such that p is not in the defined set or sets with $r_0$=0.35.

6. The display as claimed in claim 1, wherein the translation vectors a, b, p' and q' have values such that p is in the set $E_7$ with $r_0$=0.35 and γ=0.75.

7. The display as claimed in claim 1, wherein the translation vectors a, b, p' and q' have values such that p is in the set $E_9$ with $r_0$=0.35 and γ=0.75.

8. The display as claimed claim 1, wherein the pixel hexagonal grid translation vectors a and b have an aspect ratio of the lengths of the shorter to the longer vector between 0.83 and 1.

9. The display as claimed in claim 1, wherein the pixel hexagonal grid has a maximum internal angle deviation from 120 degrees of 5 degrees or less.

10. The portable device comprising a display as claimed in claim 1, wherein the portable device is configurable to operate in a portrait display mode and a landscape display mode.

11. A portable device as claimed in claim 10, comprising a mobile telephone.

12. A portable device as claimed in claim 10, comprising a tablet.

* * * * *